(12) United States Patent
Seo et al.

(10) Patent No.: US 10,057,039 B2
(45) Date of Patent: *Aug. 21, 2018

(54) METHOD AND APPARATUS FOR RECEIVING ACK/NACK IN WIRELESS COMMUNICATION SYSTEM

(71) Applicant: LG Electronics Inc., Seoul (KR)

(72) Inventors: Dongyoun Seo, Seoul (KR); Yunjung Yi, Seoul (KR); Hanbyul Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,617

(22) Filed: Sep. 5, 2017

(65) Prior Publication Data

US 2017/0366324 A1 Dec. 21, 2017

Related U.S. Application Data

(63) Continuation of application No. 15/280,576, filed on Sep. 29, 2016, now Pat. No. 9,780,940, which is a (Continued)

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1861* (2013.01); *H04L 5/005* (2013.01);
(Continued)

(58) Field of Classification Search
None
See application file for complete search history.

(56) References Cited

U.S. PATENT DOCUMENTS 9,780,940 B2 * 10/2017 Seo .................... H04L 1/1861
2011/0081913 A1 4/2011 Lee et al.
(Continued)

FOREIGN PATENT DOCUMENTS

CN 101841400 A 9/2010
CN 102394725 A 3/2012
(Continued)

OTHER PUBLICATIONS

LG Electronics Inc., "PHICH Design in Carrier Aggregation Scenarios," R1-101228, 3GPP TSG RAN WG1 Meeting #60, San Francisco, USA, Feb. 22-26, 2010, see pp. 1-4.
(Continued)

*Primary Examiner* — Phirin Sam
(74) *Attorney, Agent, or Firm* — Dentons US LLP

(57) ABSTRACT

The present invention provides a method for receiving acknowledgement/not-acknowledgement (ACK/NACK) of a terminal in a wireless communication system. The method transmits uplink data through an uplink data channel and receives ACK/NACK for the uplink data. The uplink data channel is transmitted through aggregated carriers and the aggregated carriers include a first band recognizable to first and second type terminals and a second band recognizable only to the second type terminal.

7 Claims, 14 Drawing Sheets

Related U.S. Application Data continuation of application No. 14/427,791, filed as application No. PCT/KR2013/008640 on Sep. 26, 2013, now Pat. No. 9,497,012.

(60) Provisional application No. 61/706,093, filed on Sep. 26, 2012, provisional application No. 61/723,310, filed on Nov. 6, 2012, provisional application No. 61/729,345, filed on Nov. 22, 2012, provisional application No. 61/753,921, filed on Jan. 17, 2013, provisional application No. 61/763,937, filed on Feb. 12, 2013.

(51) Int. Cl.
*H04L 1/18* (2006.01)
*H04W 74/00* (2009.01)
*H04W 72/04* (2009.01)
*H04W 76/27* (2018.01)

(52) U.S. Cl.
CPC ........ *H04L 5/0007* (2013.01); *H04W 72/042* (2013.01); *H04W 72/0413* (2013.01); *H04W 74/004* (2013.01); *H04W 76/27* (2018.02); *H04L 5/001* (2013.01)

(56) References Cited

U.S. PATENT DOCUMENTS

| | | | |
|---|---|---|---|
| 2011/0170496 A1* | 7/2011 | Fong | H04L 5/0053 370/329 |
| 2012/0044922 A1 | 2/2012 | Ishii | |
| 2012/0069802 A1 | 3/2012 | Chen et al. | |
| 2012/0182910 A1 | 7/2012 | Nakashima | |
| 2013/0039284 A1* | 2/2013 | Marinier | H04L 5/001 370/329 |
| 2013/0114419 A1* | 5/2013 | Chen | H04W 72/044 370/248 |
| 2013/0114530 A1 | 5/2013 | Chen et al. | |
| 2013/0155898 A1 | 6/2013 | Yin | |
| 2013/0183987 A1* | 7/2013 | Vrzic | H04L 5/0053 455/450 |
| 2013/0188569 A1* | 7/2013 | He | H04W 28/16 370/329 |
| 2013/0194931 A1 | 8/2013 | Lee et al. | |
| 2013/0215871 A1* | 8/2013 | Dinan | H04W 36/0072 370/331 |
| 2013/0235812 A1 | 9/2013 | Heo et al. | |
| 2013/0242882 A1* | 9/2013 | Blankenship | H04W 72/042 370/329 |
| 2013/0294369 A1 | 11/2013 | Dinan | |
| 2013/0294423 A1 | 11/2013 | Wang | |
| 2014/0056244 A1* | 2/2014 | Frenne | H04L 5/0053 370/329 |
| 2014/0293939 A1* | 10/2014 | Nory | H04W 72/0406 370/329 |
| 2014/0362832 A1 | 12/2014 | Rudolf | |
| 2015/0257138 A1* | 9/2015 | Chen | H04L 5/0048 370/329 |
| 2015/0365197 A1 | 12/2015 | Nakao | |
| 2016/0065333 A1* | 3/2016 | Blankenship | H04W 72/042 370/329 |
| 2016/0100432 A1 | 4/2016 | Dinan | |
| 2016/0105266 A1* | 4/2016 | Heo | H04L 5/001 370/329 |
| 2016/0227522 A1* | 8/2016 | Dinan | H04L 1/00 |
| 2016/0366670 A1* | 12/2016 | Feng | H04L 27/2602 |
| 2016/0374058 A1 | 12/2016 | Dinan | |
| 2016/0381667 A1 | 12/2016 | Frenne et al. | |
| 2017/0156132 A1* | 6/2017 | Blankenship | H04L 5/001 |

FOREIGN PATENT DOCUMENTS

| | | |
|---|---|---|
| CN | 102668482 A | 9/2012 |
| WO | 2012109542 | 8/2012 |

OTHER PUBLICATIONS

Qualcomm Europe, "PHICH for Multicarrier Operation," R1-094205, 3GPP TSG RAN WG1 #58bis, Miyazaki, Japan, Oct. 12-16, 2009, see pp. 1-3.

\* cited by examiner

METHOD AND APPARATUS FOR RECEIVING ACK/NACK IN WIRELESS COMMUNICATION SYSTEM

This application is a continuation of U.S. application Ser. No. 15/280,576, filed on Sep. 29, 2016, now allowed, which is a continuation of U.S. application Ser. No. 14/427,791, filed on Mar. 12, 2015, now U.S. Pat. No. 9,497,012, issued on Nov. 15, 2016, which is a continuation of 35 USC § 371 National Stage entry of International Application No. PCT/KR2013/008640 filed on Sep. 26, 2013, and claims priority to U.S. Provisional Application Nos. 61/706,093 filed on Sep. 26, 2012; 61/723,310 filed on Nov. 6, 2012; 61/729,345 filed on Nov. 22, 2012; 61/753,921 filed on Jan. 17, 2013 and 61/763,937 filed on Feb. 12, 2013, all of which are hereby incorporated by reference in their entireties as if fully set forth herein.

BACKGROUND OF THE INVENTION

Field of the Invention

The present invention relates to wireless communication, and more particularly, to a method and apparatus for receiving acknowledgement/not-acknowledgement (ACK/NACK) indicating a reception confirmation in a wireless communication system.

Related Art

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which allows separate bands to operate respective independent systems is satisfied, and a carrier aggregation (CA) is introduced. In concept, the CA aggregates a plurality of bands into one system. In this case, a band that can be independently managed is defined as a component carrier (CC).

The latest communication standard (e.g., 3GPP LTE-A or 802.16m) considers to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a system supporting carrier aggregation is called a carrier aggregation system.

Meanwhile, the wireless communication system considers a system in which more terminals are supported by one base station in comparison with the legacy system. For example, due to a technique such as machine type communication (MTC), enhanced multi user multi input multi output (MIMO), etc., there may be a need to support more terminals by one base station.

In this case, it may be difficult to transmit control information to multiple terminals when using only the conventional control channel for transmitting control information, for example, a physical downlink control channel (PDCCH) in long term evolution (LTE). This is because a problem may occur in which a radio resource of the PDCCH is not enough or an interference is severe. To solve such a problem, it is considered to allocate a new control channel in a radio resource region in which data is transmitted in the legacy system. Such a new control channel is called an enhanced-PDCCH (E-PDCCH). When using the E-PDCCH, how to determine a starting position of the E-PDCCH may be a matter to be considered.

Meanwhile, a base station transmits acknowledgement/not-acknowledgement (ACK/NACK) for uplink data received from the terminal through a physical hybrid-ARQ indicator channel (PHICH). The PHICH is located in a region to which a PDCCH, i.e., the legacy control channel, is allocated. The PHICH may also have a problem in which a radio resource is insufficient or an interference occurs if the number of terminals supported by the base station is increased and a carrier aggregation is supported. Therefore, it is considered to introduce a channel for new ACK/NACK transmission, and such a channel is called an enhanced-PHICH (E-PHICH).

Meanwhile, in a future wireless communication system, it is considered to use a carrier having a new channel structure which is not compatible with the legacy wireless communication system. Such a carrier is hereinafter called a new carrier type (NCT). A carrier used in the legacy wireless communication system is called a legacy carrier type (LCT). The future wireless communication system considers a carrier aggregation which aggregates the LCT and the NCT. In this case, how to determine a resource for transmitting ACK/NACK by a base station may be a matter to be considered.

SUMMARY OF THE INVENTION

A method and apparatus for receiving acknowledgement/not-acknowledgement (ACK/NACK) in a wireless communication system are provided.

In an aspect, a method of receiving acknowledgement/not-acknowledgement (ACK/NACK) of a terminal in a wireless communication system is provided. The method comprises transmitting uplink data through an uplink data channel and receiving ACK/NACK for the uplink data. The uplink data channel is transmitted through aggregated carriers, and the aggregated carriers include a first band recognizable to first and second type terminals and a second band recognizable only to the second type terminal.

In another aspect, a terminal is provided. The terminal comprises a radio frequency (RF) unit for transmitting and receiving a radio signal and a processor operatively coupled to the RF unit. The processor is configured for transmitting uplink data through an uplink data channel and receiving acknowledgement/not-acknowledgement (ACK/NACK) for the uplink data. The uplink data channel is transmitted through aggregated carriers, and the aggregated carriers include a first band recognizable to first and second type terminals and a second band recognizable only to the second type terminal.

According to the present invention, a carrier aggregation system can effectively perform ACK/NACK transmission for a plurality of cells. In addition, an E-PDCCH region or a PDSCH region can be effectively configured.

DESCRIPTION OF EXEMPLARY EMBODIMENTS

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advance (LTE-A) is an evolution of the LTE. For clarity, the following description will focus on the 3GPP LTE/LTE-A. However, technical features of the present invention are not limited thereto. Hereinafter, terminologies of "a first radio access technology (RAT)" and "a second RAT" may be used. The second RAT provides backward compatibility with the first RAT in some frequency bands among system bands, but may not provide backward compatibility in the remaining frequency bands. The second RAT may be an evolution of the first RAT.

User Equipment (UE) may be fixed or mobile, and may be called other terms such as an MS (mobile station), an MT (mobile UE), a UT (user UE), an SS (subscriber station), a wireless device, a PDA (personal digital assistant), a wireless modem, a handheld device, and the like.

Generally, a base station means a fixed station communicating with the UE, and may be called as other terms such as an eNB (evolved-NodeB), a BTS (Base Transceiver System), and an Access Point.

A wireless device may be served by a plurality of serving cells. Each serving cell may be defined with a downlink (DL) component carrier (CC) or a pair of the DL CC and an uplink (UL) CC. Hereinafter, the CC is also simply referred to as a carrier.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after a radio resource control (RRC) connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
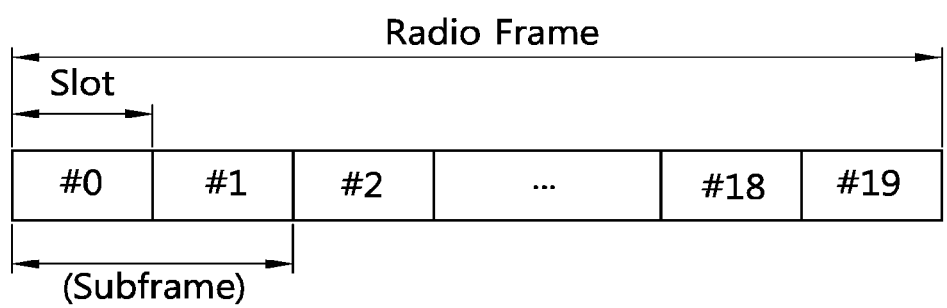
FIG. 1 illustrates a structure of a frequency division duplex (FDD) radio frame in a 3GPP LTE.

FIG. 1 illustrates a structure of a frequency division duplex (FDD) radio frame in a 3GPP LTE. The structure of a frequency division duplex (FDD) radio frame may refer to a fourth section of 3GPP TS 36.211 V8.7.0 (2009-05) "Evolved Universal Terrestrial Radio Access (E-UTRA); Physical Channels and Modulation (Release 8)".

The radio frame includes 10 subframes marked with indexes of 0~9. One subframe includes two continuous slots. A time required to transmit one subframe is a TTI (transmission time interval). For example, a length of one subframe may be 1 ms (milli-second), and a length of one slot may be 0.5 ms.

Figure 2:
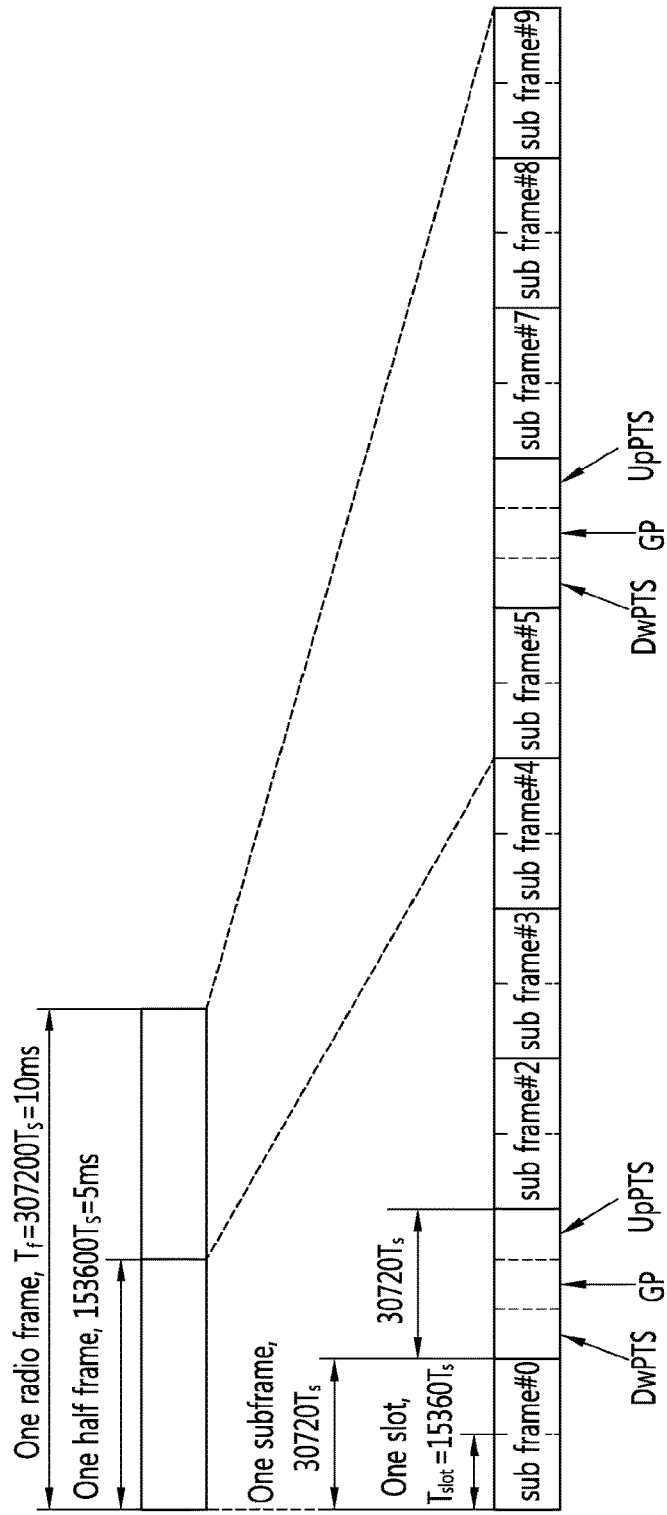
FIG. 2 illustrates a structure of a time division duplex (TDD) radio frame in a 3GPP LTE.

FIG. 2 shows a time division duplex (TDD) radio frame in 3GPP LTE.

In the TDD radio frame, a downlink (DL) subframe, an uplink (UL) subframe, and a special subframe may coexist.

Table 1 below shows an example of a UL-DL configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. Upon receiving the UL-DL configuration from a BS, a UE can know which subframe is a DL subframe or a UL subframe according to a radio frame configuration.

A subframe having an index #1 and an index #6 may be a special subframe, and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink.

Figure 3:
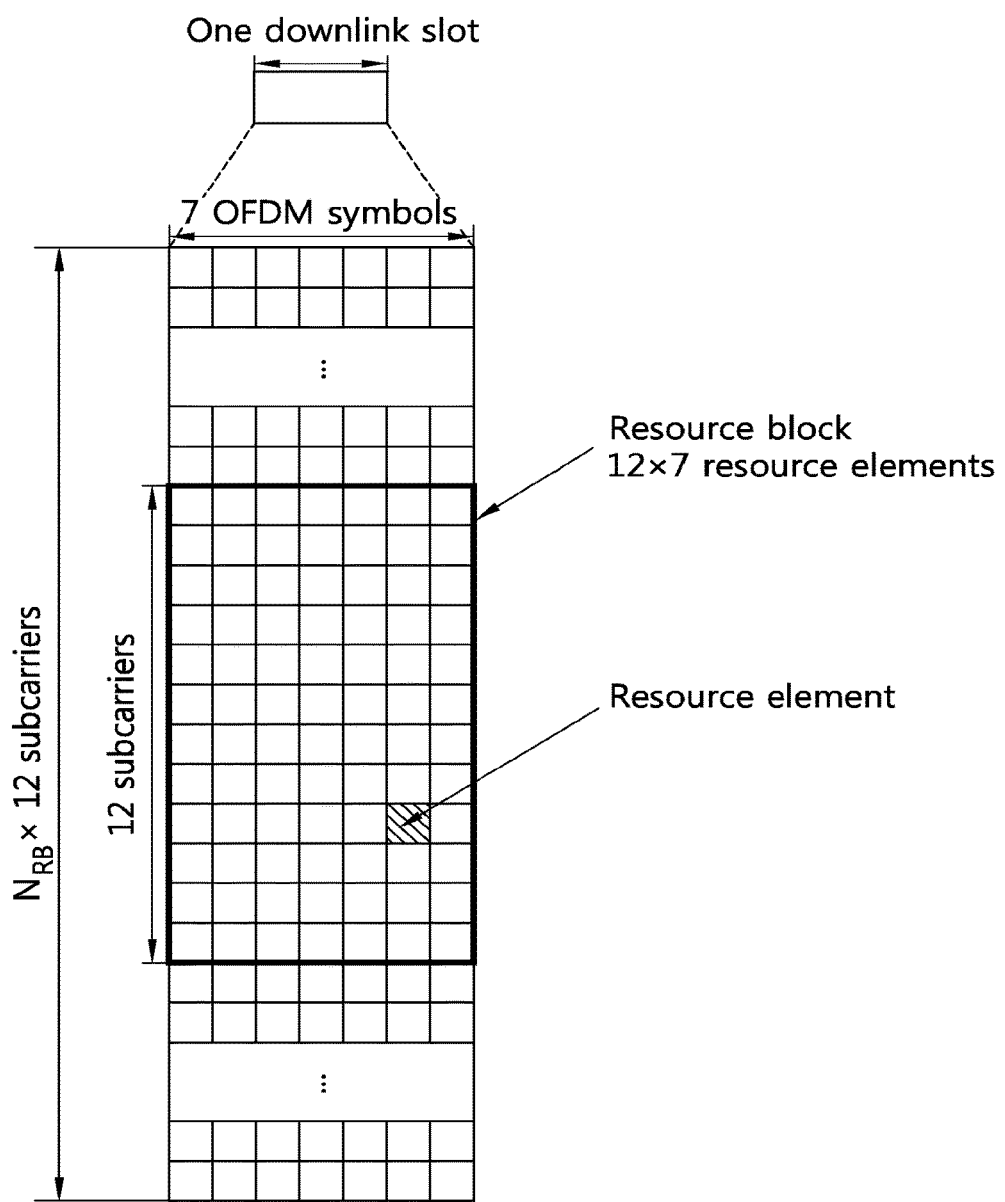
FIG. 3 illustrates an example of a resource grid with respect to one downlink slot.

FIG. 3 illustrates an example of a resource grid with respect to one downlink slot.

Referring to FIG. 3, a downlink slot includes a plurality of OFDM symbols in a time domain and $N_{RB}$ Resource Blocks (RBs) in a frequency domain. The RB includes one slot in the time domain in a resource allocation unit, and a plurality of continuous sub-carriers in a frequency domain. The number $N_{RB}$ of RBs included in the downlink slot depends on a downlink transmission bandwidth set in a cell.

For example, the number $N_{RB}$ of RBs in the LTE system may be one of 6 to 110. A structure of the uplink slot may be the same as a structure of the downlink slot.

Meanwhile, each element on the resource grid is a resource element (RE). The resource element on the resource grid may be identified by an index pair (k,l) in a slot. In this case, a k (k=0, . . . , $N_{RB}$×12−1) represents a sub-carrier index, and l(l=0, . . . , 6) represents an OFDM symbol index in the slot.

Although FIG. 3 has illustrated that one RB is configured by 7 OFDM symbols in a time domain and 12 sub-carriers in a frequency domain to include 7×12 resource elements, and the number of OFDM symbols and the number of sub-carriers in the RB are not limited thereto. A 1 slot in a normal CP may include 7 OFDM symbols, and a 1 slot in an extended CP may include 6 OFDM symbols. The number of the OFDM symbols and the number of the sub-carriers may be variously changed according to a length of the CP, a frequency spacing, and the like. One of 128, 256, 512, 1024, 1536, and 2048 may be selectively used as the number of sub-carriers in one OFDM symbol.

Figure 4:
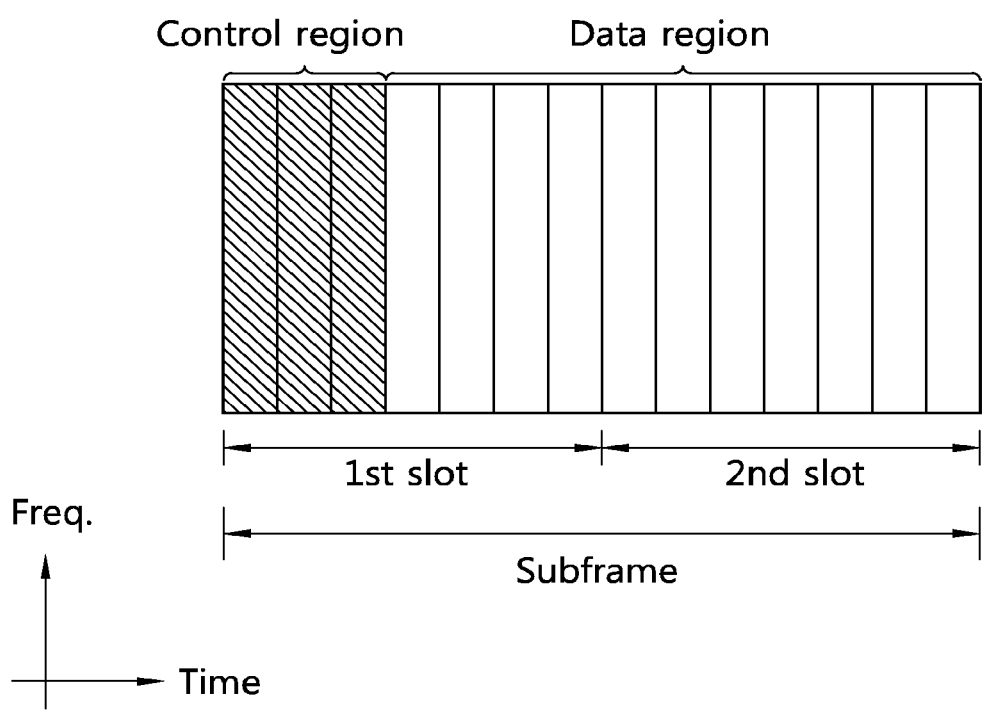
FIG. 4 illustrates a downlink subframe.

FIG. 4 illustrates a downlink subframe.

A downlink (DL) subframe is divided into a control region and a data region in a time region. The control region include maximum 4 OFDM symbols before a first slot in a subframe, but the number of OFDM symbols included in the control region may be changed. A PDCCH (Physical Downlink Control Channel) and other control channel are allocated to the control region, and a PDSCH is allocated to the data region.

As disclosed in 3GPP TS 36.211 V10.2.0, a physical control channel in a 3GPP LTE/LTE-A includes a PDCCH (Physical Downlink Control Channel), a PCFICH (Physical Control Format Indicator Channel), and a PHICH (Physical Hybrid-ARQ Indicator Channel).

A PCFICH transmitted from a first OFDM symbol of the subframe transfers a CFI (control format indicator) regarding the number of OFDM symbols (that is, a size of the control region) used to transmit control channels in the subframe. A wireless device firstly receives a CFI on the PCFICH, and then monitors the PDCCH.

Unlike the PDCCH, the PCFICH does not use blind decoding, but is transmitted through a fixed PCFICH resource of the subframe.

The PHICH transfers ACK (acknowledgement)/NACK (not-acknowledgement) signals for uplink (UL) HARQ (hybrid automatic repeat request) process. The ACK/NACK signals regarding UL data on the PUSCH transmitted by the UE are transmitted on the PHICH by the base station.

A PBCH (Physical Broadcast Channel) is transmitted from four OFDM symbols before a second slot of a first subframe of the radio frame. The PBCH transfers essential system information to communicate with the base station, and the system information transmitted through the PBCH refers to MIB (master information block). Meanwhile, system information transmitted on a PDSCH indicated by the PDCCH refers to an SIB (system information block).

Control information transmitted through the PDCCH refers to downlink control information (DCI). The DCI may include resource allocation of the PDSCH (refers to DL grant (downlink grant) or DL assignment (DL assignment)), resource allocation of PUSCH (refers to UL grant), a set of transmission power control commands and/or activation of VoIP (Voice over Internet Protocol) with respect to individual UEs in a predetermined UE group.

The usage of the DCI format can be classified as shown in Table 2 below.

TABLE 2

| DCI format | Usage |
| --- | --- |
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCI format 4 | It is used for PUSCH scheduling in one UL cell in a multi-antenna transmission mode. |

Transmission of a DL transmission block in a 3GPP LTE/LTE-A is performed a pair of the PDCCH and the PDSCH. Transmission of a UL transmission block is performed a pair of the PDCCH and the PDSCH. For example, the wireless device receives a DL transmission block on a PDSCH indicated by the PDCCH. The wireless device monitors the PDCCH in a DL subframe, and receives DL resource assignment on the PDCCH. The radio device receives a DL transmission block on a PDSCH indicated by the DL resource assignment.

The base station determines a PDCCH format according to a DCT to be sent to the wireless device to attach a CRC (Cyclic Redundancy Check) to a DCI, and masks unique identifier (refers to RNTI (Radio Network Temporary Identifier) according an owner or an application the PDCCH to CRC.

In a case of a PDCCH for a specific wireless device, an unique identifier of the wireless device, for example, a C-RNTI (Radio Network Temporary Identifier) may be masked to the CRC. Alternatively, in a case of a PDCCH for a paging message, a paging indication identifier, for example, a P-RNTI (Paging-RNTI) may be masked to the CRC. In a case of a PDCCH for system information, system information identifier, that is, SI-RNTI (system information-RNTI) may be masked to the CRC. In order to indicate a random access response being a response to transmission of the random access preamble, RA-RNTI (random access-RNTI) may be masked to the CRC. So as to indicate a TPC (transmit power control) command with respect to a plurality of wireless devices, TPC-RNTI may be masked to the CRC. In a PDCCH for semi-persistent scheduling (SPS), SPS-C-RNTI may be masked to the CRC.

If C-RNTI is used, the PDCCH transfer control information (refers to UE-specific control information) for a corresponding specific wireless device. If other RNTI is used, the PDCCH transfers common control information received by all or a plurality of wireless devices in a cell.

A DCI to which the CRC is added is encoded to generate coded data. Encoding includes channel encoding and rat matching. The coded data are modulated to generate modulated symbols. The modulated symbols are mapped to a physical RE (resource element).

The control region in the subframe includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements (REs). According to the relationship between the number of CCEs and a coding rate provided by the CCEs, a format of the PDCCH and the bit number of possible PDCCHs are determined.

One REG includes four REs, and one CCE includes 9 REGs. In order to configure one PDCCH, {1, 2, 4, 8} CCE may be used. Each element of {1, 2, 4, 8} refers to a CCE aggregation level.

The base station determines the number of CCEs used to transmit the PDDCH is determined according to a channel state. For example, one CCE may be used to transmit the PDCCH in a wireless device having an excellent downlink channel state. 8 CCEs may be used to transmit the PDCCH in a wireless device having a poor downlink channel state.

A control channel configured by one or more CCEs performs interleaving of an REG unit, and is mapped to a physical resource after cyclic shift base a cell ID is performed.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Herein, monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs having CCE indices 0 to 15, and supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of [1, 2, 4, 8].

Figure 5:
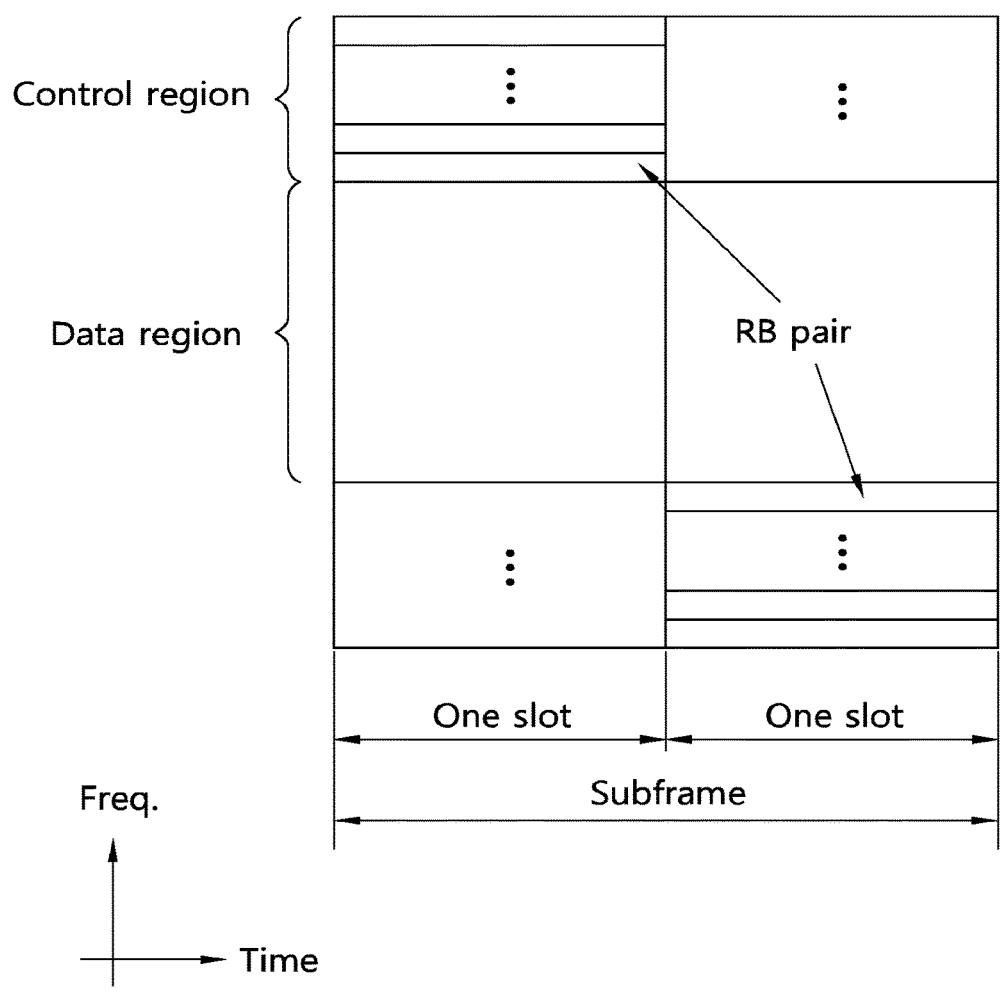
FIG. 5 illustrates a structure of an uplink subframe.

FIG. 5 illustrates a structure of an uplink subframe.

Referring to FIG. 5, the uplink subframe may be divided into a control region and a data region in a frequency region. A PUCCH (Physical Uplink Control Channel) for transmitting uplink control information is allocated to the control region. A PUSCH (Physical Uplink Shared Channel) for transmitting data (control information may be transmitted together with the data in some cases) is allocated to the data region. The UE may simultaneously transmit the PUCCH and the PUSCH or may transmit only one of the PUCCH and the PUSCH according to setting.

The PUCCH with respect to one UE is allocated as a RB pair in a subframe. RBs belonging to the RB pair have different sub-carriers in a first slot and a second slot, respectively. A frequency of an RB belonging to the RB pair allocated to the PUCCH is changed based on a slot boundary. This means that a frequency of an RB pair allocated to the PUCCH is hopped in a slot boundary. The uplink control information is transmitted through different sub-carriers according to a time so that a frequency diversity gain may be obtained.

Hybrid automatic repeat request (HARQ), acknowledgment (ACK)/non-acknowledgement (NACK), channel state information (CSI) indicating a downlink channel state, for example, a channel quality indicator (CQI), a precoding matrix index (PMI), a precoding type indicator (PTI), a rank indication (RI), etc., may be transmitted on a PUCCH.

<Semi-Persistent Scheduling: SPS>

In the wireless communication system, the UE receives scheduling information such as DL grant and UL grant through a PDCCH to perform an operation of transmitting the PUSCH. In general, the DL grant and the PDSCH are received in the same subframe. Further, in a case of the FDD, the PUSCH is transmitted after fourth subframes from a subframe receiving the UL grant. An LTE except for the dynamic scheduling provides semi-persistent scheduling (SPS).

Downlink or uplink SPS may report by which subframe semi-static transmission (PUSCH)/reception (PDSCH) is performed to the UE through a higher layer signal. For example, a parameter give as the higher layer signal may be a period and an offset value of the subframe.

The UE recognizes SPS transmission/reception through RRC signaling. If receiving activation and release signal of SPS transmission through the PDCCH, the UE performs or releases SPS transmission/reception. That is, although an SPS is allocated through RRC signaling, when SPS transmission/reception are not performed but the activation or release signal is received through the PDCCH, frequency resource (resource block) according to a resource block allocation designated in the PDCCH and modulation and a coding rate according to MCS information are applied so that SPS transmission/reception are performed in a subframe corresponding to a subframe period and an offset value allocated through RRC signaling. If an SPS release signal is received through the PDSSH, SPS transmission/reception stop. If a PDCCH (SPS reactivation PDCCH) including an SPS activation signal is again received, the stopped SPS transmission/reception restarts using a frequency resource and an MCS designated by a corresponding PDCCH. Hereinafter, a PDCCH for SPS activation is called SPS activation PDCCH, and a PDCCH for SPS release is called an SPS release PDCCH.

<HARQ (Hybrid Automatic Repeat Request)>

Upon transmission/reception of data between the base station and the UE, when the frame is not received or damaged, an error control method includes an ARQ (Automatic Repeat request) scheme and a HARQ (hybrid ARQ) scheme which is a developed scheme thereof. In the ARQ scheme, after one frame is transmitted, a confirmation message ACK is waited for. Only when a reception side exactly receives the frame, the reception side sends the confirmation message ACK. When an error occurs in the frame, the reception side sends a NACK (negative-ACK) message, and a reception frame with the error removes the information in a receiving end buffer. When the transmission side receives the ACK signal, the transmission side transmits a next frame. When receive the NACK message, the transmission side retransmits the frame.

Unlike the ARQ scheme, according to the HARQ scheme, when the received frame cannot be demodulated, a receiving end transmits an NACK message to the transmitting end.

However, when the received frame is stored in the buffer for a predetermined time so that the frame is retransmitted, the frame is coupled with the received frame so that a reception success rate is increased.

In recent years, more efficient HARQ scheme than the ARQ scheme may be widely used. There are various types of HARQ schemes. The HARQ scheme may be divided into synchronous HARQ and asynchronous HARQ according to retransmission timing. The HARQ scheme may be divided into a channel-adaptive scheme and a channel-non-adaptive scheme according to presence of reflection of a channel state with respect to an amount of a resource used upon retransmission.

Figure 6:
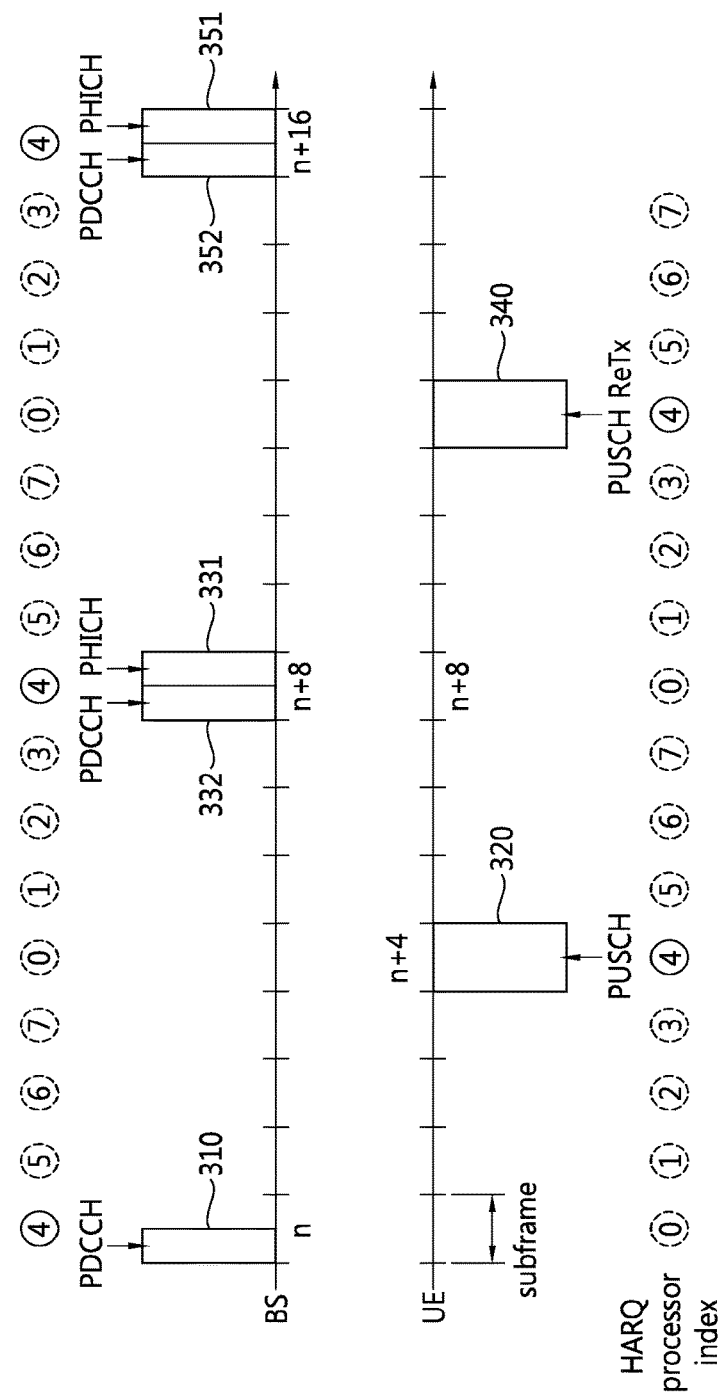
FIG. 6 illustrates a synchronization HARQ.

FIG. 6 shows an example of synchronization HARQ.

In a synchronization HARQ scheme, subsequent retransmission is achieved at a timing determined by a system when initial transmission fails. That is, if it is assumed that a timing at which retransmission is achieved after initial transmission is every $8^{th}$ time unit (subframe), since this is agreed in advance between a BS and a UE, there is no need to additionally report this timing. However, if a NACK message is received in a data transmission side, data is retransmitted in the every $8^{th}$ time unit until an ACK message is received.

The UE transmits a UL transport block on a PUSCH 320 by using an initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant. Alternatively, retransmission of previous data may be suspended and a UL grant may be sent for transmission of new data. In case the ACK signal, the BS may send the UL grant for new transmission through the PDCCH. In addition, the BS may send the UL grant for retransmission (or retransmission UL grant). Upon receiving the retransmission UL grant, the UE ignores the ACK/NACK signal and follows an instruction of the retransmission UL grant. This is because the UL grant has higher reliability since the ACK/NACK signal does not have CRC and the UL grant has CRC.

When the UL grant is not received and the NACK signal is received, the wireless device sends a retransmission block on a PUSCH 340 in an $(n+12)^{th}$ subframe. For the transmission of the retransmission block, if the retransmission UL grant is received on the PDCCH 332, the wireless device uses the received retransmission UL grant, and if the retransmission UL grant is not received, the wireless device uses the previously received UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission is performed in the $(n+4)^{th}$ subframe, retransmission is performed in the $(n+12)^{th}$ subframe, and thus synchronous HARQ is performed with an HARQ period corresponding to 8 subframes.

On the other hand, the asynchronous HARQ scheme may be achieved by newly scheduling a retransmission timing or through additional signaling. A timing at which a retransmission of previously failed data is achieved varies by several factors such as a channel state or the like.

The channel-non-adaptive HARQ scheme is a scheme in which data modulation used in retransmission, the number of resource blocks, a coding scheme, or the like is determined as determined in the initial transmission. Unlike this, the channel-adaptive HARQ scheme is a scheme in which the data modulation used in retransmission, the number of resource blocks, the coding scheme, or the like vary depending on a channel state.

For example, in the channel-non-adaptive HARQ scheme, a transmitting side transmits data by using 6 resource blocks in the initial transmission, and the 6 resource blocks are also used in the retransmission.

On the other hand, in the channel adaptive HARQ scheme, even if data is initially transmitted by using the 6 resource blocks, the data is retransmitted by using more (or less) than 6 resource blocks according to a channel state.

According to this classification, four HARQ combinations can be achieved. Examples of an HARQ scheme used in general include an asynchronous and channel-adaptive HARQ scheme and a synchronous and channel-non-adaptive HARQ scheme. The asynchronous and channel-adaptive HARQ scheme can maximize retransmission efficiency by adaptively varying a retransmission timing and an amount of resources in use according to a channel state, but is not considered in general for an uplink since there is a disadvantage in that a signaling overhead is great. Meanwhile, the synchronous and channel-non-adaptive HARQ scheme has an advantage in that there is almost no signaling overhead since a retransmission timing and a resource allocation are agreed in a system, but has a disadvantage in that retransmission efficiency is very low when it is used in a channel state which varies significantly.

At present, the 3GPP LTE uses the asynchronous HARQ scheme in a downlink case and uses a synchronous HARQ scheme in an uplink case.

Meanwhile, in a downlink case for example, after data is transmitted through scheduling, a time delay occurs as shown in FIG. 6 until next data is transmitted again after information of ACK/NAK is received from a UE. This is a delay which occurs due to a channel propagation delay and a time required for data decoding and data encoding. To achieve seamless data transmission without being affected by such a delay duration, a transmission method using an independent HARQ process is used.

For example, if a minimum period between current data transmission and next data transmission is 8 subframes, seamless data transmission can be achieved by preparing 8 independent processes. In LTE FDD, up to 8 processes can be allocated if it does not operate in MIMO.

<Carrier Aggregation>

Now, a carrier aggregation system is described.

Figure 7:
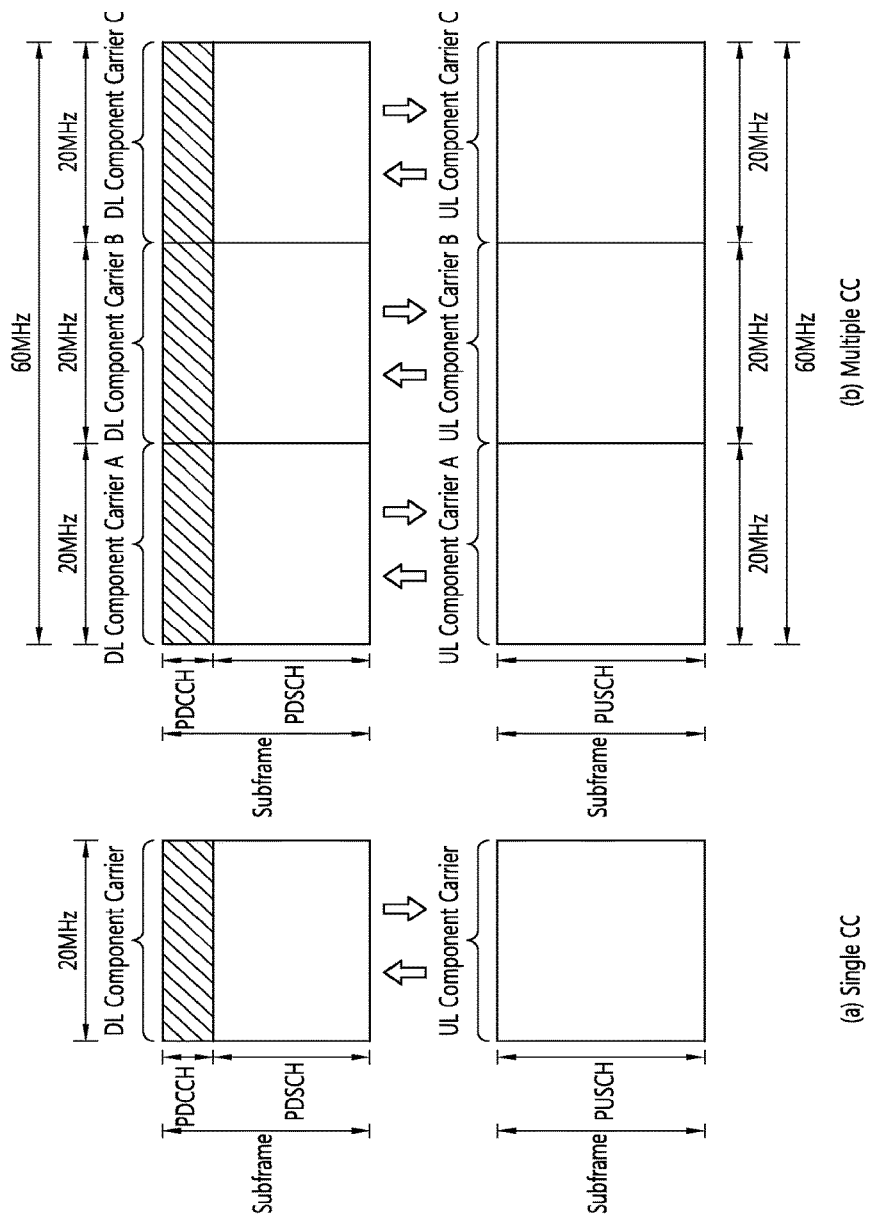
FIGS. 7(*a*) and 7(*b*) illustrate an example of comparing an existing single carrier system and a carrier aggregation system.

FIGS. 7(a) and 7(b) show an example of comparing the legacy single carrier system and a carrier aggregation system.

Referring to FIGS. 7(a) and 7(b), the single carrier system supports only one carrier as to a UE in an uplink and a downlink. Although the carrier may have various bandwidths, only one carrier is assigned to the UE. Meanwhile, multiple component carriers (CCs), i.e., DL CCs A to C and UL CCs A to C, can be assigned to the UE in the carrier aggregation (CA) system. The CC implies a carrier used in the CA system, and may be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs may directly use a bandwidth that is used in the legacy system in order to provide backward compatibility with the legacy system. For example, a 3GPP LTE system may support a carrier having a bandwidth of 1.4 MHz, 3 MHz, 5 MHz, 10 MHz, 15 MHz, and 20 MHz, and a 3GPP LTE-A system may configure a wideband of 20 MHz or higher by using each carrier of the 3GPP LTE system as a CC. Alternatively, the wideband may be configured by defining a new bandwidth without having to directly use the bandwidth of the legacy system.

A system frequency band of the wireless communication system is classified into a plurality of carrier-frequencies. The carrier frequency means a center frequency of a cell. Hereinafter, the cell may mean a downlink frequency resource and an uplink frequency resource. Alternatively, the cell may mean a combination of the downlink frequency resource and an optional uplink frequency resource. Further, generally, when the CA is not considered, one cell may include a pair of uplink and downlink frequency resources.

In order to transmit/receive packet data through the specific cell, the UE should finish configuration with specific cell. In this case, the configuration means a state of finishing reception of system information necessary to transmit/receive data with respect to a corresponding cell. For example, the configuration may include the whole procedure to receive common physical layer parameters necessary to transmit/receive data, or MAC (media access control) layer parameters, or parameters necessary for a specific operation at an RRC layer. If a cell in which the configuration is terminated receives only information indicating that packet data may be transmitted, the cell may transmit and receive a packet at once.

The cell in which the configuration is terminated may be in an activation state or a deactivation state. In this case, the activation means that data are transmitted or received or transmission or reception of the data in a ready state. The UE may monitor or receive a control channel PDCCH and a data channel PDSCH of an activated cell in order to confirm resources (frequency, time, or the like) allocated to the UE.

The deactivation means that transmission or reception of traffic data is impossible and measurement or transmission/reception of minimum information is possible. The UE may receive system information SI necessary to receive a packet from a deactivated cell. Meanwhile, the UE does not monitor or receive a control channel PDCCH and a data channel PDSCH of the deactivated cell in order to confirm resources (frequency, time, or the like).

The cell may be classified into a primary cell, a secondary cell, and a serving cell.

The primary cell means a cell operating at a primary frequency, and means a cell performing initial connection establishment procedure or connection reestablishment procedure with the base station or a cell indicated as a primary cell at a handover procedure.

The secondary cell means a cell operating in a secondary cell. If RRC connection is established, the secondary cell is used to provide an additional preset wireless resource.

In a case of UE in which the CA is not set or does not provide the CA, the serving cell is configured by the primary cell. When the carrier aggregation is set, the term 'serving cell' represents a cell set to the UE and a plurality of serving cell may be configured. One serving cell may be configured by one downlink component carrier or a pair of {downlink component carrier, uplink component carrier}. A plurality of serving cells may be configured by a primary cell and one secondary cell or a plurality of secondary cells.

A PCC (primary component carrier) signifies a component carrier (CC) corresponding to a primary cell. The PCC is a CC where the UE initially achieves connection or RRC connection with the base station among a plurality of CCs. The PCC is a special CC to provide connection or RRC connection for signaling regarding a plurality of CC, and to manage UE context which is connection information associated with the UE. Further, when the PCC accesses the UE in an RRC connection mode, the PCC is always in an active state. A downlink component carrier corresponding to the primary cell refers to a DownLink Primary Component Carrier (DL PCC) and an uplink component carrier corresponding to the primary cell refers to an uplink primary component carrier (UL PCC).

The SCC (secondary component carrier) means a CC corresponding to the secondary cell. That is, the SCC is a CC allocated to the UE except for a PCC. The SCC is an extended carrier when the UE selects for additional resource allocation except for the PCC, and may be divided into a activation state or a deactivation state. A downlink component carrier corresponding to the secondary cell refers to a DownLink secondary Component Carrier (DL SCC) and an uplink component carrier corresponding to the second cell refers to an uplink secondary component carrier (UL SCC).

The primary cell and the secondary cell have following characteristics.

First, the primary cell is used to transmit the PUCCH. Second, the primary cell is always activated, but the second cell is a carrier which is activated/deactivated according to a specific condition. Third, when the primary cell experiences a Radio Link Failure (hereinafter referred to as 'RLF'). Fourth, the primary cell may be changed according to variation in a security key, a RACH (Random Access CHannel) procedure, and an accompanying handover procedure. Fifth, NAS (non-access stratum) information is received through the primary cell. Sixth, in a case of an FDD system, the primary cell always configures a pair of the DL PCC and the UL PCC. Seventh, different component carriers CCs may be set as the primary cell every UE. Eighth, the primary cell may be replaced by only handover, cell selection/cell reselection procedures. In addition of a new secondary cell, RRC signal may be used to transmit system information of a dedicated secondary cell.

In a component carrier configuring the serving cell, the downlink component carrier may configure one serving cell, or the downlink component carrier and the uplink component carrier are connected and configured so that one serving cell may be configured. However, the serving cell may not be configured by only one uplink component carrier.

Activation/deactivation of the component carrier is similar to concept of activation/deactivation of the serving cell. For example, activation of the serving cell 1 means activation of the DL CC1 on the assumption that the serving cell 1 is configured by a DL CC1. If the activation of the serving cell 2 means activation of a DL CC2 and the UL CC2 on the assumption that the serving cell 2 is configured by connecting and configuring a DL CC2 and a UL CC2. In this meaning, each component carrier may correspond to a serving cell.

The number of component carriers aggregated between downlink and uplink may be differently set. When the number of CCs in the downlink is the same as the number of CCs in the uplink, the aggregation is symmetric. When the number of CCs in the downlink is different from the number of CCs in the uplink, the aggregation is asymmetric. Further, the sizes (that is, bandwidths) of the CCs may be different from each other. For example, when five CCs is used to configure 70 MHz band, 5 MHz CC (carrier #0)+20 MHz CC (carrier #1)+20 MHz CC (carrier #2)+20 MHz CC (carrier #3)+5 MHz CC (carrier #4) may be configured.

As described above, the CA system may support a plurality of CCs, that is, a plurality of serving cells unlike the single carrier system.

Such a CA system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carrier except for a component carrier fundamentally linked with the specific component carrier. That is, the PDCCH and the PDSCH may be transmitted through different DL CCs, a PUSCH may be transmitted through a UL CC different from a UL CC liked with a DL CC to which a PDCCH including an UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

A CA system to support the cross-carrier scheduling may include a carrier indicator field (CIF) included in a DCI (downlink control information) format according to the related art. In the system to support the cross-carrier scheduling, for example, an LTE-A system, since a CIF is added to an existing DCI format (that is, a DCI format used in an LTE), 3 bits may be spread, and a PDCCH structure may reuse an existing coding method, a resource allocation method (that is, a CCE based resource mapping).

The base station may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the base station transmits a PDCCH with respect to PDSCH/PUSCH to be scheduled through only the DL CCs included in the PDCCH monitoring DL CC group. The PDCCH monitoring DL CC group may be configured to UE-specific, UE group-specific, or cell-specific.

Non-cross carrier scheduling implies that scheduling information and data depending thereon are transmitted/received in the same carrier (cell), and is also called self-scheduling.

Figure 8:
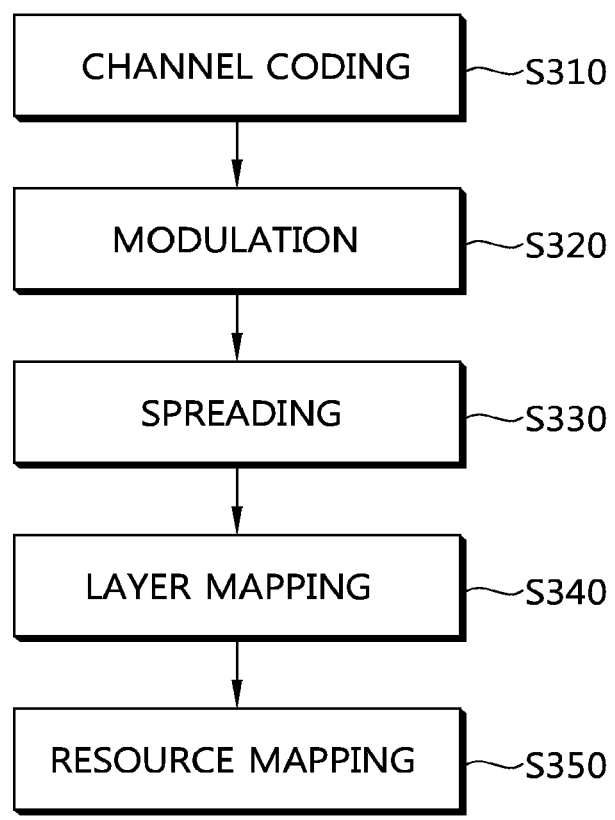
FIG. 8 shows a structure of a PHICH in 3GPP LTE.

FIG. 8 shows a structure of a PHICH in 3GPP LTE.

One PHICH carries only 1-bit ACK/NACK corresponding to a PUSCH for one UE, that is, corresponding to a single stream.

In step S310, the 1-bit ACK/NACK is coded into 3 bits by using a repetition code having a code rate of 1/3.

In step S320, the coded ACK/NACK is modulated using binary phase shift keying (BPSK) to generate 3 modulation symbols.

In step S330, the modulation symbols are spread by using an orthogonal sequence. A spreading factor (SF) is $N^{PHICH}_{SF}=4$ in a normal CP, and is $N^{PHICH}_{SF}=2$ in an extended CP. The number of orthogonal sequences used in the spreading is $N^{PHICH}_{SF}*2$ to apply I/Q multiplexing.

PHICHs which are spread by using $N^{PHICH}_{SF}*2$ orthogonal sequences can be defined as one PHICH group.

Table 3 below shows an orthogonal sequence for the PHICH.

TABLE 3

| sequence index $n^{seq}_{PHICH}$ | orthogonal sequence | |
|---|---|---|
| | normal CP ($N^{PHICH}_{SF}$ = 4) | extended CP ($N^{PHICH}_{SF}$ = 2) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | |
| 5 | [+j −j +j −j] | |
| 6 | [+j +j −j −j] | |
| 7 | [+j −j −j +j] | |

In step S340, layer mapping is performed on the spread symbols.

In step S350, the layer-mapped symbols are transmitted by being mapped to resources.

A plurality of PHICHs mapped to resource elements of the same set constitute a PHICH group. Each PHICH included in the PHICH group is identified by a different orthogonal sequence. In the FDD system, $N^{group}_{PHICH}$, i.e., the number of PHICH groups, is constant in all subframes, and can be determined by Equation 1 below.

$$N^{group}_{PHICH} = \begin{cases} \lceil N_g(N^{DL}_{RB}/8) \rceil & \text{for normal cyclic prefix} \\ 2 \cdot \lceil N_g(N^{DL}_{RB}/8) \rceil & \text{for extended cyclic prefix} \end{cases} \quad [\text{Equation 1}]$$

Herein, Ng denotes a parameter transmitted through a physical broadcast channel (PBCH), where Ng∈{1/6,1/2,1,2}. $N^{DL}_{RB}$ denotes the number of DL RBs. ceil(x) is a function for outputting a minimum value among integers equal to or greater than x. floor(x) is a function for outputting a maximum value among integers equal to or less than x.

The wireless device identifies a PHICH resource by using an index pair ($n^{group}_{PHICH}$, $n^{seq}_{PHICH}$) used by the PHICH. A PHICH group index $n^{group}_{PHICH}$ has a value in the range of 0 to $N^{group}_{PHICH}-1$. An orthogonal sequence index $n^{seq}_{PHICH}$ denotes an index of an orthogonal sequence.

An index pair ($n^{group}_{PHICH}$, $n^{seq}_{PHICH}$) is obtained according to Equation 2 below.

$$n^{group}_{PHICH} = (I^{lowest\_index}_{PRB\_RA} + n_{DMRS}) \bmod N^{group}_{PHICH} + I_{PHICH} N^{group}_{PHICH}$$

$$n^{seq}_{PHICH} = (\lfloor I^{lowest\_index}_{PRB\_RA}/N^{group}_{PHICH} \rfloor + n_{DMRS}) \bmod 2N^{PHICH}_{SF} \quad [\text{Equation 2}]$$

Herein, $n_{DMRS}$ denotes a cyclic shift of a demodulation reference signal (DMRS) within the most recent UL grant for a transport block related to corresponding PUSCH transmission. The DMRS is an RS used for PUSCH transmission. $N^{PHICH}_{SF}$ denotes an SF size of an orthogonal sequence used in PHICH modulation. $I^{lowest\_index}_{PRB\_RA}$ denotes the smallest PRB index in a 1st slot of corresponding PUSCH transmission. $I_{PHICH}$ is 0 or 1.

A physical resource block (PRB) is a unit frequency-time resource for transmitting data. One PRB consists of a plurality of contiguous REs in a frequency-time domain. Hereinafter, the RB and the PRB are used for the same concept.

In a radio frame used in time division duplex (TDD), the number of PHICH groups may change variously between downlink subframes. The number of PHICH groups may be given as $m_i N^{group}_{PHICH}$, and $m_i$ may be given as shown in Table 4 below. Further, $N^{group}_{PHICH}$ is given as shown in Equation 1 above, and an index $n^{group}_{PHICH}$ ranges from 0 to $m_i N^{group}_{PHICH} - 1$ in a downlink subframe having a PHICH resource.

TABLE 4

| Uplink-downlink | Subframe number i | | | | | | | | | |
|---|---|---|---|---|---|---|---|---|---|---|
| configuration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Meanwhile, a PHICH duration is configured by a higher layer, and may be configured as shown in Table 5 below.

TABLE 5

| | Non-MBSFN subframes | | |
|---|---|---|---|
| PHICH duration | Subframes 1 and 6 in case of frame structure type 2 | All other cases | MBSFN subframes on a carrier supporting PDSCH |
| Normal | 1 | 1 | 1 |
| Extended | 2 | 3 | 2 |

Now, the present invention will be described.

In a system enhanced from LTE release 10, a greater number of UEs can access to one BS in comparison with the legacy system due to a technique such as machine type communication (MTC), enhanced multi user-multi input multi output (MU-MIMO), etc. In this case, it may be difficult to deliver control information to a plurality of UEs by using only the existing control region, i.e., a PDCCH region, in a DL subframe. That is, the control region may be insufficient. In addition, a plurality of RRHs or the like are deployed in a cell, which may cause a problem of an interference in the control region.

The LTE-A system considers to introduce a new control channel to solve a resource shortage problem of a PDCCH which is a channel for transmitting control information and a reception performance deterioration problem of a PDCCH region caused by an interference. For convenience of explanation, the new control channel is called an enhanced-PDCCH (E-PDCCH).

The conventional PDCCH differs from the E-PDCCH as follows.

1) The conventional PDCCH may be located in a control region in a subframe, that is, a region consisting of first N OFDM symbols (where N is any natural number in the range of 1 to 4), whereas the E-PDCCH may be located in a data region in the subframe, that is, a region consisting of the remaining OFDM symbols other than the N OFDM symbols.

2) The conventional PDCCH can be decoded on the basis of a cell-specific reference signal, i.e., CRS, that can be received by all UEs in a cell, whereas the E-PDCCH can be decoded on the basis of not only the CRS but also a DM-RS which is specific to a particular UE. Therefore, similarly to the PDSCH, beamforming can be applied to the E-PDSCH by using precoding, and as a result, a reception SINR may be increased.

3) The conventional PDCCH may be applied to a UE which operates in LTE, whereas the E-PDCCH may be selectively applied to a UE supporting LTE-A. Of course, the UE supporting the LTE-A may also support the conventional PDCCH.

In terms of resources constituting the E-PDDCH, there may be a distributed E-PDCCH consisting of distributed resources and a localized E-PDCCH consisting of localized resources. The distributed E-PDCCH can acquire a diversity gain and can be used to transmit control information for several UEs. The distributed E-PDCCH has a frequency selective property and can be used to transmit control information for a particular UE.

Meanwhile, in the LTE-A, a greater amount of ACK/NACK may be transmitted and an interference may become severe in comparison with the legacy system such as a multi-node system in which multiple nodes are included in a cell, a carrier aggregation system supporting multiple carriers, etc. Therefore, a PHICH may also have a resource shortage problem and a reception performance deterioration problem caused by an interference. To solve these problems, the LTE-A considers to introduce a new PHICH in addition to the conventional PHICH. For convenience of explanation, the new PHICH is called an enhanced-PHICH (E-PHICH). The PHICH and the E-PHICH are channels on which a BS transmits ACK/NACK for a UL data channel transmitted by a UE. Unlike a case where the PHICH is configured in the PDCCH region, the E-PHICH may be configured in the PDSCH region. For example, the E-PHCIH may be configured in the E-PDCCH region configured in the PDSCH region.

Figure 9:
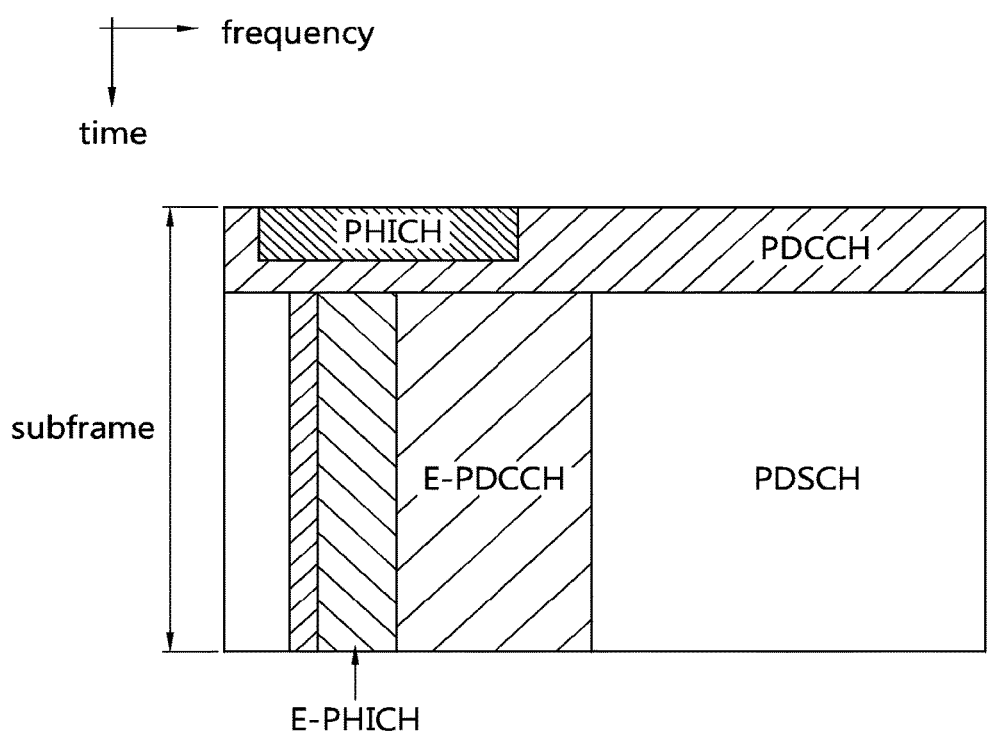
FIG. 9 shows an example of configuring an E-PHICH region and an E-PDCCH region.

FIG. 9 shows an example of configuring an E-PHICH region and an E-PDCCH region.

Referring to FIG. 9, the E-PDCCH region may be configured in a PDSCH region.

Similarly to the PDCCH region, the E-PDCCH region may include an enhanced-common search space (E-CSS) in which all UEs or a specific UE group in a cell search for an E-PDCCH thereof and an enhanced-UE-specific search space (E-USS) in which only a specific UE searches for an E-PDCCH thereof. Alternatively, only one of the E-CSS and the E-USS may be included.

Meanwhile, the E-PHICH may be configured in the E-PDCCH region. For example, the E-PHICH may be configured in the E-CSS. In this case, the E-PHICH may be used to transmit ACK/NACK for a plurality of UEs through multiplexing.

<Selection of PHICH or E-PHICH and Selection of Cell for ACK/NACK for PUSCH>

Even if both of the PHICH and the E-PHICH are supported in a wireless communication system, only one of the PHICH and the E-PHICH may be configured for each cell or for each subframe, or both of them may be configured.

If the PHICH and the E-PHICH can be configured in the subframe, the UE may monitor both of the PHICH and the E-PHICH to receive ACK/NACK for a PUSCH, which may be ineffective and may increase power consumption of the UE.

Hereinafter, for convenience of explanation, from a perspective of the UE, a cell for monitoring the PDCCH is called a PDCCH cell, a cell for monitoring the E-PDCCH is called an E-PDCCH cell, a cell for transmitting the PHICH is called a PHICH cell, and a cell for transmitting the E-PHICH is called an E-PHICH cell.

The PDCCH cell may be a cell in which a search space is configured in the PDCCH region, and the E-PDCCH cell may be a cell in which the search space is configured in the E-PDCCH region. The PDCCH cell and the E-PDCCH cell may be mutually exclusive or may overlap with each other. The PHICH cell and the E-PHICH cell also may be mutually exclusive or may overlap with each other. That is, in one cell, the UE may be configured to monitor the PHICH in some subframes, and the UE may be configured to monitor the E-PHICH in other subframes. That is, an operation described below may differ for each subframe.

Now, a case where monitoring of an E-PHICH is not configured and a case where monitoring of the E-PHICH is configured are described below distinctively.

I. When it is Configured that a UE does not Monitor an E-PHICH

1. First Embodiment: In a Case where a UL Grant Exists in a PDCCH

1) A corresponding PDCCH cell is a PHICH cell. That is, a PHICH is transmitted together in a cell in which the PDCCH is transmitted. Alternatively, 2) the PHICH cell may be designated with RRC. That is, a BS may configure a cell in which the PHICH is transmitted to a UE through an RRC message. In this case, the PHICH cell and the PDCCH cell may be configured independently. This may be preferable for a consistency for a case of designating a PHICH transmission cell by using RRC as to an E-PDCCH cell.

2. Second Embodiment: In a Case where a UL Grant Exists in an E-PDCCH

1) Embodiment 2-1

When a plurality of cells are configured to a UE, a PDCCH cell among the plurality of cells may be a PHICH cell. If the PDCCH cell is plural in number, the PHICH cell may be a primary cell.

Since a cell having a relatively good channel state is selected as the PDCCH cell, the PHICH cell is selected from PDCCH cells so that the UE can reliably receive the PHICH. In particular, since the primary cell performs decoding of a PDCCH region in system information reception and initial access, a cell which is examined for PDCCH reception is selected.

2) Embodiment 2-2

A PHICH cell may be a cell in which a UL grant is transmitted through an E-PDCCH. That is, a BS may transmit a PHICH through a cell in which the UL grant is transmitted. This will be described with reference to FIG. 13. In this manner, cell planning may be well achieved such that an interference of a PDCCH region in which a PHICH is transmitted is not severe in a cell which transmits a control channel or such that an interference between different cells is excluded according to a feature of the PHICH which is shifted on a frequency axis on the basis of a cell ID. This method may perform an operation irrelevant to reconfiguration of RRC signaling in terms of utilizing a PHICH resource of an activated cell in which the control channel is transmitted.

3) Embodiment 2-3: A PHICH Cell for a PUSCH May be Pre-Designated with RRC This method may decrease a PHICH transmission load concentrated in a primary cell. If a plurality of NCT cells (cells in which a PHICH resource is not present) are configured in one UE, a PHICH cell applied commonly to all NCT cells may be designed through one RRC signaling. Alternatively, the PHICH cell may be designated for each NCT cell.

In addition, this method may be more effective in a sense that an LCT cell more suitable for an NCT cell can be selected when an aggregation is achieved between the NCT cell and the LCT cell. In case of a synchronization cell, an indirect indication is possible when a reference cell is indicated with RRC.

Meanwhile, a cell designated as a PHICH cell for a PUSCH of another cell may be restricted. For example, it may be restricted only to a cell for monitoring a PDCCH among a plurality of cells. This is because a UL grant is scheduled to a PDCCH for a cell which operates in the conventional way as to a corresponding cell, and thus monitoring of an additional PHICH region is not necessary, whereas if a cell other than a PDCCH monitoring cell is designated as a PHICH cell, a PHICH resource of a cell designated as the PHICH cell must be additionally decoded.

Meanwhile, if a cell configured for the PDCCH monitoring is deactivated, monitoring of the PDCCH region stops. In this case, the situation may be handled as an exception so that the cell is designated as a PHICH cell and monitoring of the PHICH is continued, or it may be restricted such that a cell configured to a PHICH cell for a PUSCH of another cell is always activated.

4) Embodiment 2-4

Unlike methods of transmitting ACK/NACK through a PHICH, a PHICH for a PUSCH may not be transmitted. In this case, retransmission using HARQ may be performed only by using a UL grant. Conventionally, if there is no UL grant when NACK is received through the PHICH, a UE retransmits a PUSCH through a resource by using a previous UL grant. However, the present invention may not allow HARQ retransmission using NACK, and may allow HARQ retransmission only using a UL grant.

The UE may determine whether to transmit a new PUSCH or retransmit a PUSCH on the basis of a new data indicator (NDI) included in the UL grant. That is, if the NDI of the UL grant indicates new PUSCH transmission, it may be assumed that the UE receives ACK for a previously transmitted PUSCH. This method corresponds to a case of operating with synchronization HARQ.

Meanwhile, asynchronous HARQ may be applied as a method for allowing only transmission using a UL grant. For this, a field indicating a UL HARQ process number may be added to the UL grant. Such an operation may be applied only for an NCT in which a PDCCH does not exist.

A PDCCH and a PHICH may not exist in a new carrier type (NCT). In this case, the embodiments 2-1, 2-3, and 2-4 may be applied. In the NCT, to decrease the conventional CRS overhead, a channel may be estimated by using a UE-specific RS and physical channel demodulation may be performed. Therefore, a PDCCH and PHICH for performing demodulation by estimating a channel on the basis of the CRS may not be used in the NCT. In addition, in the existing legacy carrier type (LCT), the embodiment 2-2 may be applied.

In case of the embodiments 2-2 and 2-3, if a corresponding cell is not a primary cell, a PHICH may be configured by using a cell ID signaled with RRC, the number of reference signal antenna ports, Ng, and a PHICH duration.

The embodiment 2-2 may be configured when an E-PDCCH cell in which a UL grant is transmitted is a PDCCH cell.

In addition, a PHICH may be used in case of a UL HARQ process scheduled with a PDCCH and a PHICH-less operation may be used in case of a UL HARQ process scheduled with an E-PDCCH, that is, the embodiment 2-4 may be used. Alternatively, the embodiment 2-2 may be used if a subframe for receiving a retransmission UL grant is a subframe configured with monitoring of a USS of a PDCCH, and the embodiment 2-1, 2-3, or 2-4 may be applied if it is a subframe configured with monitoring of a USS of an E-PDCCH and the E-PHICH does not exist in the subframe.

The embodiments 2-1, 2-3, and 2-4 may be more suitable for a new carrier type (NCT) in which a CRS is not configured and thus cannot configure a PHICH. For example, if the E-PDCCH is transmitted in the NCT, since the PHICH cannot be configured in the NCT, the method of the embodiment 2-2 cannot be used, and the aforementioned method is required.

II. Third Embodiment: In a Case where a UE is Configured to Monitor an E-PHICH

If the E-PHICH is configured through a higher layer signal, a PHICH and the E-PHICH may exist simultaneously in the same subframe. Therefore, a BS may report to the UE about which channel is used to transmit ACK/NACK between the PHICH and the E-PHICH. A selective use of the PHICH and the E-PHICH depends on respective features thereof. In case of the PHICH, it may be difficult to avoid performance deterioration if it is located in a PDCCH region and thus an interference of the PDCCH region is severe in a neighboring cell, whereas in case of the E-PHICH, an inter-cell interference can be avoided since it may be configured in a PDSCH region. On the other hand, an additional PDSCH resource is consumed in the configuration of the E-PHICH.

1) Embodiment 3-1

ABS may report which channel between a PHICH and an E-PHICH is used for each subframe to transmit ACK/NACK for the PUSCH through an RRC message. A PHICH monitoring configuration and an E-PHICH monitoring configuration may be performed in the same subframe as that used in a PDCCH monitoring configuration and an E-PDCCH monitoring configuration, respectively.

2) Embodiment 3-2

Alternatively, a selection of a PHICH and an E-PHICH may be determined according to a DCI format used as a UL grant. For example, the PHICH may be used for a PUSCH scheduled with a DCI format 0, and the E-PHICH may be used for a PUSCH scheduled with a DCI format 4. A UE may implicitly know which channel between the PHICH and the E-PHICH is used to receive ACK/NACK on the DCI format included in the UL grant.

3) Embodiment 3-3

A selection of a PHICH and an E-PHICH may be indicated by using a bit field combination of a UL grant. For example, a specific state of a DMRS field may be allowed to indicate a use of the E-PHICH.

4) Embodiment 3-4

If a UL grant for a corresponding HARQ process is transmitted, the E-PHICH may not be transmitted. Therefore, upon detection of a UL grant, even if there is a resource allocated to the E-PHICH, the UE may ignore this and use the resource as a PDSCH.

Fourth Embodiment: Designation of a PHICH Cell/Subframe or an E-PHICH Cell/Subframe Embodiment 4-1

If a UL grant exists in a PDCCH, a PDCCH cell (or subframe) is a PHICH cell (or subframe), and if the UL grant exists in an E-PDCCH, an E-PDCCH cell (or subframe) may be an E-PHICH cell (or subframe).

Embodiment 4-2

For each cell in which a PUSCH is transmitted, a BS may configure a designation of a PHICH monitoring cell and an E-PHICH monitoring cell to a UE through an RRC message. That is, the BS may report which channel between a PHICH and an E-PHICH is used to transmit ACK/NACK through an RRC message for each cell in which the PUSCH is transmitted. Alternatively, which channel between the PHICH and the E-PHICH is used to transmit ACK/NACK for the PUSCH may be configured through the RRC message for each subframe in one cell. That is, the UE monitors a corresponding channel according to a configured state.

Embodiment 4-3

A PHICH may be used in case of a UL HARQ process scheduled with a PDCCH, and an E-PHICH may be used in case of a UL HARQ process scheduled with an E-PDCCH.

The aforementioned third embodiments and the fourth embodiments may be used in combination.

<Configuration of E-PHICH>

An E-PHICH may be configured with an independent channel different from a PDCCH or an E-PDCCH similarly to a relation of PDCCH-PHICH.

Alternatively, the E-PHICH may be transmitted in a DCI format of the E-PDCCH. In this case, it may be transmitted by performing CRC scheduling thereon by using an E-PHICH identifier which is allocated for each UE group by multiplexing HARQ ACK for a plurality of UEs (such as an identifier is called an E-PHICH-RNTI). Alternatively, only for a UE which transmits a PUSCH, a compact DCI format including ACK/NACK without resource allocation information or scheduling information such as NDI, MCS, DMRS, etc., (information such as TPC or the like may be included) may be transmitted by performing CRC scheduling with a C-RNTI allocated to the UE. Such a compact DCI format may be transmitted with the same length as a DCI format 0/1A, thereby being able to avoid an increase of blind decoding. If a UL transmission mode is a mode in which up to 2 codewords can be transmitted, it may be configured such that 2-bit ACK/NACK is received or spatially bundled ACK/NACK is received.

If a PUSCH transmission UL subframe corresponding to a DL subframe in which an E-PHICH is transmitted is two or more in number in a time or frequency domain (this may occur in a TDD UL-DL configuration 0 or may occur when scheduling a plurality of cells in an E-PHICH transmission cell), the following method may be applied.

1) When Applying DCI with CRC-Scrambled E-PHICH-RNTI.

An E-PHICH-RNTI scrambled to a DCI format in which ACK/NACK is included for each subframe or cell may be configured separately. Alternatively, a compact DCI format including ACK/NACK may be identified according to a value $I_{PHICH}$ or a CIF.

Alternatively, one E-PHICH-RNTI may be applied to all of DCI formats including ACK/NACK.

2) When Applying DCI with CRC-Scrambled C-RNTI.

All PHICHs corresponding to one compact DCI format may be configured and transmitted.

If a PHICH is transmitted with one DCI, a mapping order of a PHICH bit field may be arranged in an ascending order of a CIF according to a most significant bit (MSB), or starting from a DL subframe which is advanced temporally, or in an ascending order of a codeword number.

When applying the E-PHICH-RNTI, UEs for sharing this may be allowed to search a common search space to read the same resource. For this, a configuration of a search space for detecting DCI scrambled with the E-PHICH-RNTI may be determined on the basis of the E-PHICH-RNTI or may start at a pre-determined value (E-CCE index=0).

If a specific E-PDCCH group is used to transmit the DCI scrambled with the E-PHICH-RNTI, in order to avoid an increase in the number of blind decoding attempts, detecting of a DCI format 0/1A (this is a common format which exists in all transmission modes) may not be attempted. Alternatively, the DCI scrambled with the E-PHICH-RNTI may be detected only in a specific search space.

If one of E-PDCCH sets is dedicatedly used for transmission of DCI scrambled with the E-P-PHICH-RNTI, blind decoding may be performed to detect the DCI scrambled with the E-PHICH-RNTI by the number of times of attempting the blind decoding used only in a corresponding set.

If the E-PHICH is configured for DCI detection, the number of times of attempting the blind decoding for a corresponding cell may be increased. In case of the existing secondary cell, blind decoding is performed only in a UE-specific search space. However, if there is a need to detect the DCI scrambled with the E-PHICH-RNTI, the number of times of attempting the blind decoding for this may be added.

Meanwhile, in case of an NCT in which a PHICH is not configured, non-cross carrier scheduling (i.e., self-scheduling) may be not allowed, and only non-cross carrier scheduling in an LCT may be allowed. To implement this, the existing CRS-based PDCCH transmission may not be performed in the NCT. In addition, the E-PDCCH may not be configured in the NCT.

Which one is used among the methods may be signaled through RRC.

<PHICH or E-PHICH Selection and Cell Selection in Carrier Aggregation Between Multiple Sites>

In carrier aggregation, a plurality of cells (carriers) used by one BS may be aggregated, or respective carriers used by different BSs, e.g., a macro BS and a small BS, may be aggregated. The latter may be carrier aggregation between a plurality of sites. In the carrier aggregation between the plurality of sites, an operation of a case where a PHICH is not present in a cell in which a PUSCH is transmitted may be applied with extension to an operation of a case where the PHICH is not present in a site including the cell in which the PUSCH is transmitted.

Meanwhile, if a delay of a backhaul is great between sites, due to a time delay of information sharing between cells, transmission of a dynamic scheduling control channel and transmission of a data channel may be configured independently for each site. In this case, if a PHICH of an LCT is utilized, it may be configured to use a PHICH resource of the LCT in a site in which a PUSCH is transmitted.

In addition, for the use of the E-PHICH, the E-PHICH is also configured in a cell of the same site and is utilized. Therefore, even if there is an LCT more suitable for another site, instead of utilizing it, the E-PHICH is configured in the same site, or a PHICH-less operation is configured.

In addition, even if data is transmitted through UL/DL split between sites, a control channel is configured in a site in which the data is transmitted. That is, even if a cell A of a site 1 transmits data by utilizing only DL and a cell B of a site 2 transmits data by utilizing only UL, control information (e.g., a DL grant, a PUCCH) of the cell A may be transmitted through the UL of the cell A, and control information (e.g., a UL grant, an (E)PHICH) of the cell B may be transmitted through the DL of the cell B.

<Method of Configuring PHICH Resource>

In a future wireless communication system, a plurality of component carriers are used for communication using a wider band, or a structure of an independent area consisting of resource blocks transmitted only through a data channel without a control channel is proposed for an effective use of a system resource.

Figure 10:
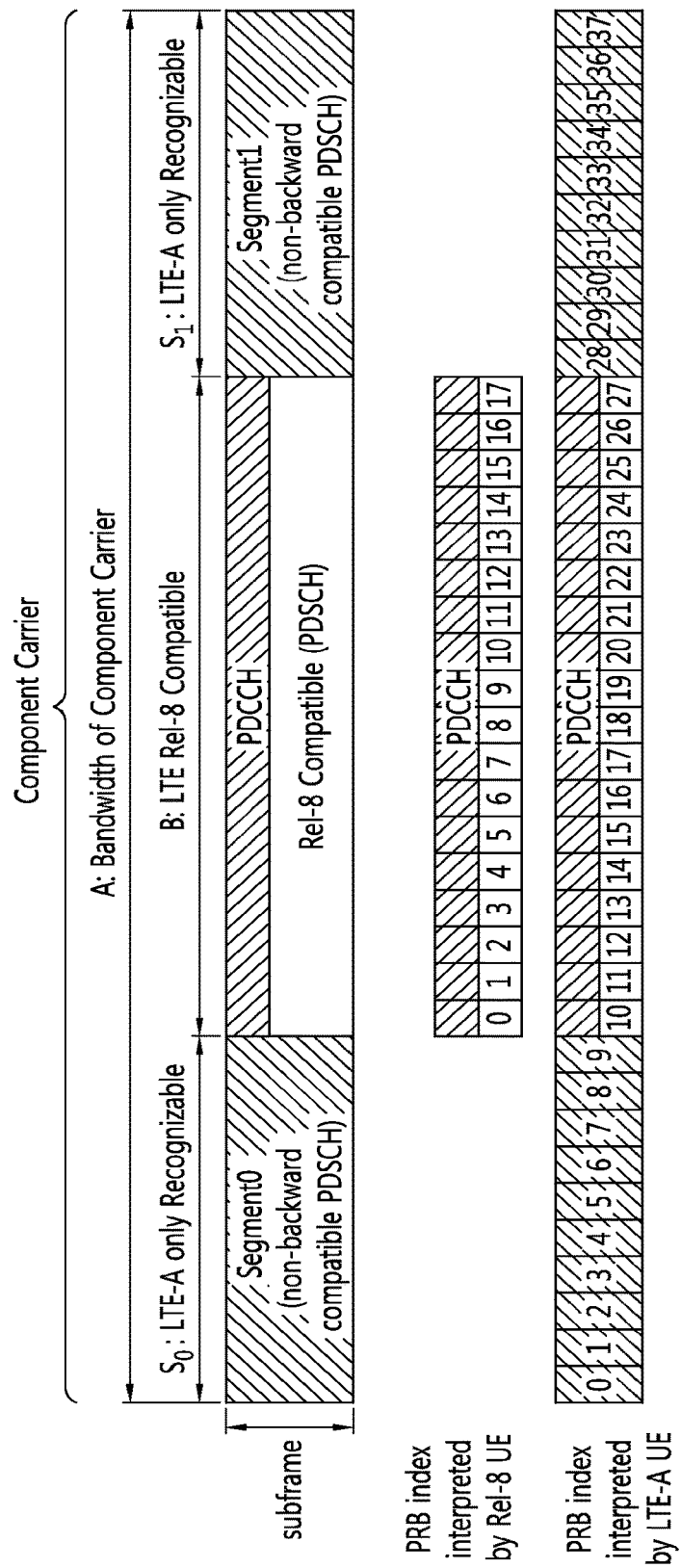
FIG. 10 shows an example of a structure of a carrier including a segment.

FIG. 10 shows an example of a structure of a carrier including a segment.

The segment may be a frequency band which does not provide backward compatibility. For example, the segment may be a band in which a control channel is not included.

In case of LTE, one subframe consists of 12 or 14 OFDM symbols, and one or more of the OFDM symbols are used for control channel transmission. A region used for the control channel transmission is called a PDCCH region. The PDCCH region uses a resource allocation scheme having a control channel element (CCE) structure. On the other hand, a region used for data channel transmission is called a PDSCH region. The PDSCH region uses a resource allocation scheme having a resource block structure. A region indicated by B in FIG. 10 may conform to the LTE (Rel-8)-based channel structure and resource allocation scheme.

In case of an LTE-A UE supporting LTE-A, an LTE-A dedicated frequency band may be configured for the purpose of transmitting data in a greater amount in comparison with an LTE case or because of a restriction condition of a center frequency interval. In FIG. 10, a band denoted by $S_0$ and $S_1$ may be an LTE-A dedicated frequency band. In this case, a system band recognized by an LTE UE is different in size from a system band recognized by an LTE-A UE as shown in FIG. 10, and thus a PRB index interpreted by the LTE UE may also be different from that of the LTE-A UE.

For convenience of explanation, it is assumed hereinafter that an A-band is greater than a B-band, and the A-band includes the B-band. In this case, a UE which recognizes the B-band is called a type-B UE, and a UE which recognizes the A-band is called a type-A UE. That is, a UE which recognizes the A-band consisting of the B-band recognized by the type-B UE and additional bands that cannot be recognized by the type-B UE (the bands are called segments, for example, $S_0$ and $S_1$ of FIG. 10) is called the type-A UE.

In the legacy PHICH, as expressed by Equation 2, a mapping relation is configured sequentially with a resource block index of a PUSCH, and a UE can know which PHICH resource is used to transmit ACK/NACK by a BS by applying an offset value signaled with a PHICH index corresponding to a lowest resource block index $I^{lowest\_index}_{PRB\_RA}$ of an allocated PUSCH.

Meanwhile, since there is a restriction conventionally in that an uplink band cannot be configured to be greater than a downlink band, the downlink band can be regarded as a maximum value of the uplink band. The total number of PHICH resources is determined by applying a parameter Ng with respect to the downlink band, and thus it is impossible to extend the PHICH resource by considering an extended uplink band due to a segment band. Therefore, a shortage of the PHICH resource may occur. Hereinafter, it is proposed a method of configuring a PHICH resource for a PUSCH scheduled in a segment band by a type-A UE when there are different types of UEs.

<Order Arrangement Method of PUSCH Resource Block Index>

As described in Equation 2, a PHICH resource is determined on the basis of a PRB index of corresponding PUSCH transmission. If the aforementioned segment is aggregated and used in the legacy LTE carrier, how to index a PUSCH resource block in the aggregated carrier may be a matter to be considered.

FIGS. 11(A)-11(D) show an example of PUSCH indexing methods.

First Embodiment

Referring to FIG. 11(A), indexing is achieved starting from a low frequency as to the entirety of an A-band. When applying this method, an index of a B-band is recognized differently between a type-B UE and a type-A UE.

That is, the type-A UE recognizes that an index of a resource block of the B-band is from 10 to 27, whereas the type-B UE recognizes that the index is from 0 to 17. Therefore, a complexity occurs in PHICH index collision avoidance.

Further, there may be a need for a method in which the conventional equation is applied by subtracting resource blocks having a lower index than a B-band from indexing of SRS and PUCCH resources and thereafter the subtracted resource blocks are compensated and mapped. Meanwhile, there is an advantage in that continuous PUSCH resources can be allocated to a B-band and an S-band by using one UL grant.

An index of the B-band may be maintained in initial access, and a new index may be applied after the S-band is allocated at a later time.

Second Embodiment

Referring to FIG. 11(B), an index of a B-band is maintained without alteration, and an index of an added S-band is assigned subsequently to an index the B-band. An order of assigning an index between added S-bands may start from a low frequency band, or may conform to signaling from a BS. In each band, indexing may be performed starting from a low frequency. As such, if the index of the B-band is maintained without alteration, the entire scheduling of the A-band is possible with one UL grant, but there is a disadvantage in that resource allocation is achieved discontinuously. However, there is an advantage in that an operation in the existing band can be maintained.

Third Embodiment

Referring to FIG. 11(C), an index of a B-band is maintained without alteration, and an index of an added S-band is newly assigned. An order of assigning an index between added S-bands may start from a low frequency band, or may conform to signaling from a BS. In each band, indexing may be performed starting from a low frequency. Disadvantageously, scheduling of a B-band and an S-band cannot be performed with one UL grant.

Fourth Embodiment

Referring to FIG. 11(D), an index of a B-band is maintained without alternation, and an index of an added S-band is newly assigned for each S-band. In each band, indexing may be performed starting from a low frequency. Disadvantageously, each of split S-bands also has to use a UL grant.

The first embodiment to the fourth embodiment may be selected and combined for use.

Figure 11:
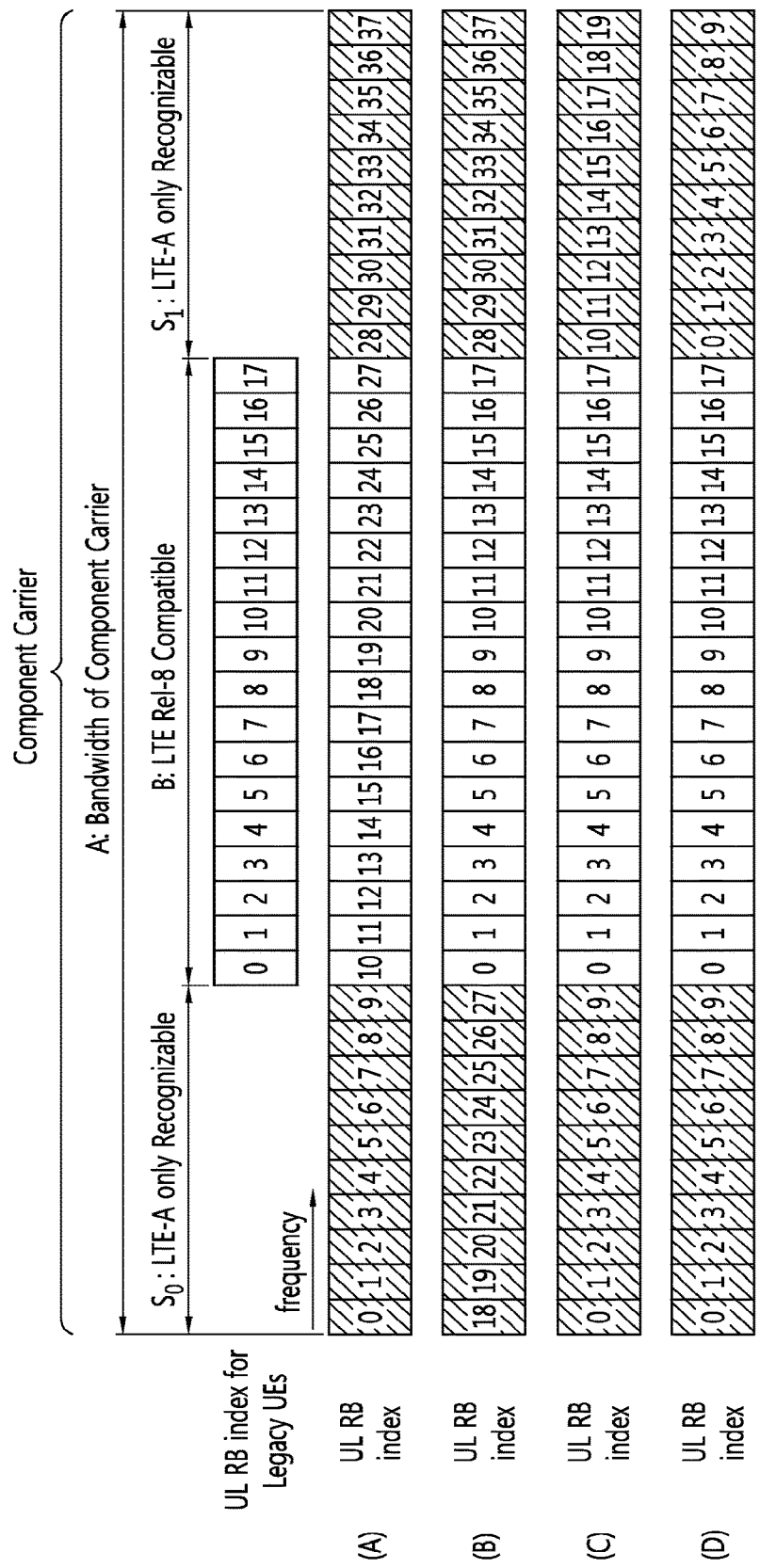
FIGS. 11(A)-11(D) show an example of PUSCH indexing methods.

If PUSCH indexing of FIG. 11 is used, a collision of a PHICH resource may occur. To avoid this, a cyclic shift based on a value $n_{DMRS}$ included in a UL grant may be adjusted. $n^{group}_{PHICH}$ and $n^{seq}_{PHICH}$ may be given by Equation 3 below.

$$n^{group}_{PHICH} = (I_{PRB\_RA} + n_{DMRS}) \bmod N^{group}_{PHICH} + I_{PHICH} N^{group}_{PHICH}$$

$$n^{seq}_{PHICH} = (\lfloor I_{PRB\_RA}/N^{group}_{PHICH} \rfloor + n_{DMRS}) \bmod 2N^{PHICH}_{SF} \quad \text{[Equation 3]}$$

In Equation 3 above, $n_{DMRS}$ is mapped from a cyclic shift of a DMRS field included in the latest PDCCH which includes an uplink DCI format for a transport block related to corresponding PUSCH transmission. If the PDCCH including the uplink DCI format does not exist and a first PUSCH is scheduled with SPS or if the first PUSCH is scheduled by a random access response grant, $n_{DMRS}$ is set to 0.

In Equation 3, $I_{PRB\_RA}$ may be given by Equation 4 below.

$$I_{PRB\_RA} = \begin{cases} I^{lowest\_index}_{PRB\_RA} & \begin{array}{l}\text{for the first } TB \text{ of a}\\ PUSCH \text{ with associated}\\ PDCCH \text{ or for the case of}\\ \text{no associated } PDCCH\\ \text{when the number of}\\ \text{negatively acknowledged}\\ TBs \text{ is not equal to the number of } TBs\\ \text{indicated in the most recent}\\ PDCCH \text{ associated with}\\ \text{the corresponding } PUSCH\end{array}\\ I^{lowest\_index}_{PRB\_RA} + 1 & \begin{array}{l}\text{for a second } TB \text{ of } PUSCH\\ \text{with associated } PDCCH\end{array} \end{cases}$$

[Equation 4]

$I^{lowest\_index}_{PRB\_RA}$ denotes a lowest PRB index in a first slot of corresponding PUSCH transmission.

Figure 12:
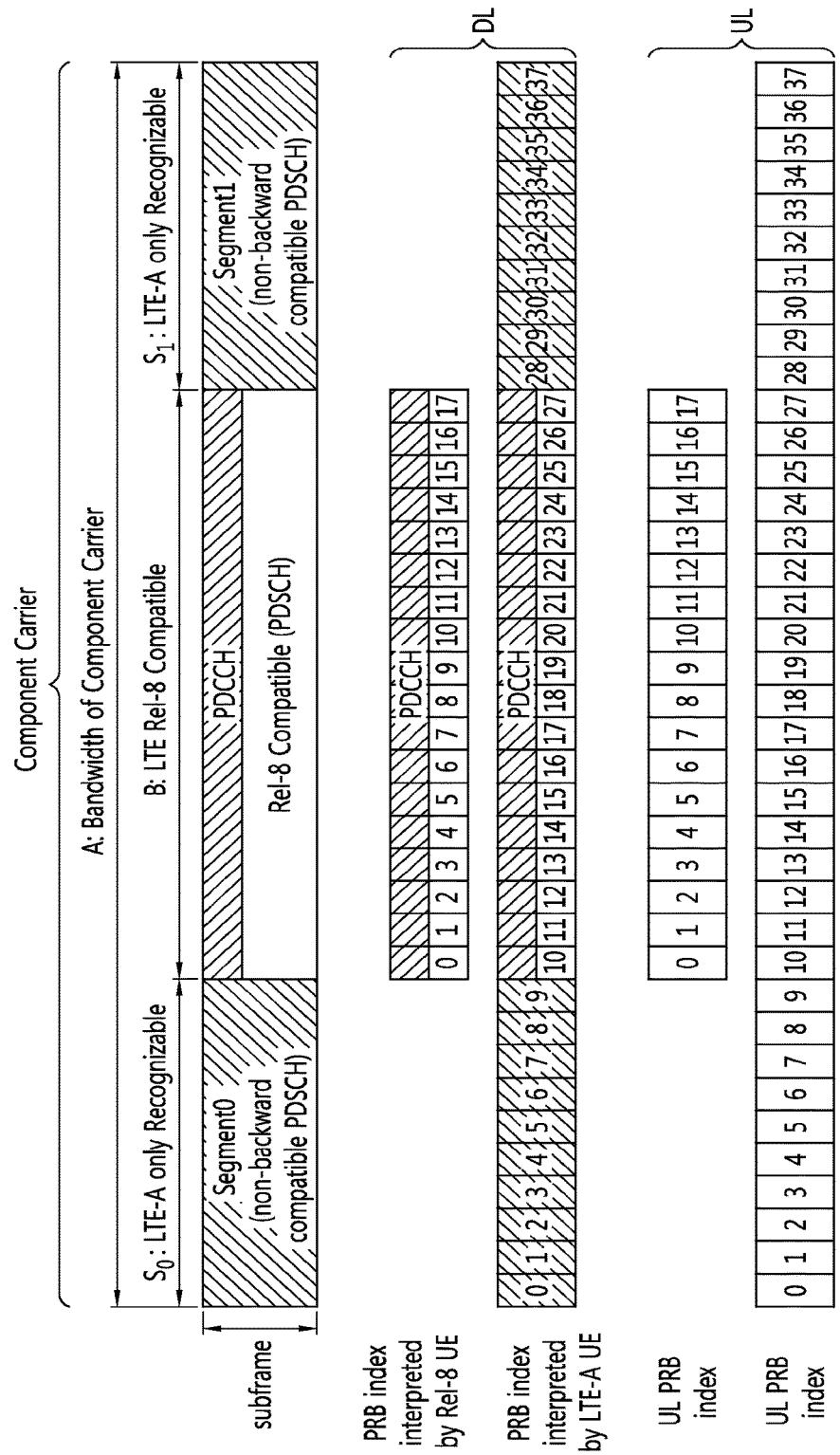
FIG. 12 shows an example of configuring an uplink band when a band including a segment is configured as a downlink band.

FIG. 12 shows an example of configuring an uplink band when a band including a segment is configured as a downlink band.

Referring to FIG. 12, the segment may be applied only to a downlink, and in an uplink case, only an uplink band recognized by a type-B UE may be used. In order to decrease an adjacent band's interference which occurs by a resource block added with the segment, it is necessary to use a more accurate RF filter, which may result in an increase in a cost of the UE. Therefore, it may be advantageous to apply such a method. Relatively, a cost increase caused by the more accurate RF filter may not be a significant burden to a BS.

In case of the type-A UE in TDD, a DL subframe may be recognized as a resource block allocable band until an A-band, and a UL subframe may be recognized as a resource block allocable band only until a B-band.

Alternatively, in a downlink case, a PDCCH, a CRS, etc., are present, and thus there is a need to identify a compatible band and a segment band, whereas in an uplink case, it is not necessary to identify them. In this case, an uplink band may be allocated with the same size to the type-B UE and the type-A UE. This may be applied limitedly only to FDD since the type-B UE may recognize a downlink band and an uplink band differently in TDD.

<When Applying E-PHICH or Applying PHICH-Less Operation>

When an S-band is configured, a PHICH resource of the existing B-band may be insufficient if an increase of a resource block is great. For this, an E-PHICH may be used, or a retransmission method based on a UL grant without a PHICH response may be used. It may be applied to a case where the S-band is allocated or a case where a lowest index of a PUSCH belongs to the S-band when the S-band and the B-band are commonly allocated. Alternatively, it may be applied to a UE which uses the entirety of the A-band.

<When Using Different UL-DL Configurations or when Using Different Frame Structures in Aggregation of LCT and NCT>

In case of using a PHICH of the existing LCT as to a PUSCH of an NCT not having an E-PHICH, it is applicable if the NCT and the LCT use the same TDD UL-DL configuration and the same frame structure. Herein, in the LCT, cell-specific UL-DL configuration information is delivered through SIB1, and if the LCT is aggregated with a secondary cell, the cell-specific UL-DL configuration information is RRC-signaled when the secondary cell is added/modified. On the other hand, since SIB1 may not be transmitted in the NCT, information which is RRC-signaled is the cell-specific UL-DL configuration information.

However, when using an aggregation between the NCT and the LCT using different TDD UL-DL configurations or an aggregation between a TDD cell and an FDD cell, a cell for transmitting a PHICH and a cell for transmitting a PUSCH may have different PUSCH HARQ timings, and thus there may be a case where a PHICH resource is not configured in some DL subframes of a PHICH cell. As a method for avoiding such a problem, the following method may be applied.

1) In the aggregation between the LCT and the NCT, PUSCH transmission may not be achieved in the NCT. For this, in case of the FDD, a UL carrier may not be linked to an NCT DL carrier. In case of the TDD, a UL subframe corresponding to the NCT DL subframe may not be configured (e.g., only a DL subframe may be used in a UL-DL configuration). In other words, in the NCT cell, only a DL carrier/subframe may be configured instead of configuring a UL carrier/subframe.

2) In the aggregation of the LCT and the NCT, an aggregation between carriers having different UL-DL configurations or different frame structures (e.g., an aggregation between a TDD carrier and an FDD carrier) may not be allowed. Such a restriction may be applied only to a carrier aggregation combination which may have a case in which a PHISCH resource is not configured in some DL subframes of a PHICH cell for transmitting a PHICH.

3) A PHICH-less operation is applied to a case where a PHICH resource is not configured in some DL subframes of a PHICH cell not transmitting the PHICH. The PHICH-less operation implies that retransmission/new transmission is performed only by using a UL grant for scheduling the same cell. For this, a UE reports ACK to a higher layer by assuming that the ACK is transmitted through a PHICH in a subframe in which the UL grant is not received. In this case, PUSCH retransmission is deferred.

4) The E-PHICH may be used for a case where a PHICH resource is not configured in some DL subframes of the PHICH cell for transmitting the PHICH.

5) In case of aggregating carriers having different UL-DL configures or different frame structures in the aggregation between the LCT and the NCT, only cross-carrier scheduling may be allowed, and the PHICH cell for transmitting the PHICH may be configured as a cell in which a UL grant is transmitted. The cross-carrier scheduling may be limited to a primary cell.

6) If carries using different UL-DL configurations are aggregated in the aggregation between the LCT and the NCT and if non-cross-carrier scheduling (based on an E-PDCCH) of the NCT is performed, instead of a rule (conforming to a cell-specific reference PUSCH HARQ timing of a secondary cell) used in the non-cross-carrier scheduling between the LCT and the LCT, a reference timing of the cross-carrier scheduling between the LCT and the LCT may be applied to the secondary cell (i.e., NCT).

If carriers having different frame structures are aggregated in the aggregation between the LCT and the NCT and if non-cross-carrier scheduling (based on an E-PHCCH) of the NCT is performed, instead of a rule used in non-cross carrier scheduling between the LCT and the LCT, a reference timing of the cross-carrier scheduling between the LCT and the LCT may be applied to a secondary cell (i.e., NCT). For example, it may conform to a PUSCH HARQ timing of a primary cell.

If carriers having different frame structures are aggregated when aggregating a plurality of LCTs and a plurality of NCTs and if non-cross carrier scheduling of the NCT (based on an E-PDCCH) is performed, a PHICH cell may be restricted to use the same frame structure or the same UL-DL configuration.

Table 6 below shows a DL subframe in which a PHICH exists in a TDD UL-DL configuration and FDD.

TABLE 6

| UL-DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | H | H | | | | H | H | | | |
| 1 | | H | | | H | | H | | | H |
| 2 | | | | H | | | | | H | |
| 3 | H | | | | | | | | H | H |
| 4 | | | | | | | | | H | H |
| 5 | | | | | | | | | H | |
| 6 | H | H | | | | H | H | | | H |
| FDD | H | H | H | H | H | H | H | H | H | H |

In Table 6 above, H denotes a DL subframe in which a PHICH exists.

An aggregation of the LCT and the NCT may be allowed only for a case where all of DL subframes of the LCT corresponding to DL subframes denoted by H in the NCT have a UL-DL configuration/frame structure in which a PHICH exists (e.g., when the NCT has a UL-DL configuration 4 and the LCT has a UL-DL configuration 3).

It may be restricted such that he LCT having the UL-DL configuration/frame structure including all DL subframes denoted by H in the NCT is selected as a PHICH cell.

If a cell using a UL-DL configuration 0 is a PHICH cell in the aforementioned methods, there is a case where PHICH resources are allocated twice in amount so that the resources are respectively mapped to two UL subframes (resources are identified by $I_{PHICH}=0,1$). In this case, one of $I_{PHICH}=0,1$ may be set as a default value. For a load distribution, the value $I_{PHICH}$ may be applied for each carrier index (CI). For example, $I_{PHICH}=1/0$ may be mapped according to whether the CI is an odd number/even number. This may also occur in the combination of the LCT and the LCT, and the same may also be applied thereto.

In case of aggregating carriers having the same TDD UL-DL configuration and the same frame structure, a method of effectively utilizing the existing resource without a problem in utilizing a PHICH of the LCT may be applied. However, there may be a problem if the method is applied in other cases. Therefore, as to the NCT, it is effective to selectively apply the method of utilizing the legacy PHICH and the method of not utilizing the legacy PHICH. The selection may use a pre-determined scheme according to a cell combination or may be performed through RRC signaling.

<Starting Position of E-PDCCH in Cell for Receiving PHICH>

In case of using the legacy PHICH without an E-PHICH, the legacy PHICH duration has an effect on a PDCCH region. Therefore, an OFDM symbol span of the PDCCH region depending on the PHICH duration must be considered when configuring an E-PDCCH region. In particular, if an OFDM symbol starting position of the E-PDCCH is configured on the basis of a PCFICH, when configuring the PCFICH, it may be configured dynamically by considering the PHICH duration.

In case of a cell in which a UE does not read the PHICH, the OFDM symbol starting position of the E-PDCCH is designated with RRC, and in case of a cell in which the UE reads the PHICH, the OFDM symbol starting position of the E-PDCCH may be determined in such a manner that a PCFIDCH is detected to confirm a span of a PDCCH region, and a start of an E-PDCCH region may be recognized starting from a next OFDM symbol. This is because PCFICH reception may be reliable in case of the cell capable of reading the PHICH.

However, even for the cell capable of reading the PHICH, the following method may be considered when the OFDM symbol starting position of the E-PDCCH is configured with RRC. The same may also be applied when an OFDM symbol starting position of the PDSCH is determined.

For example, it may be applied to an operation performed when the PDSCH is received in CoMP. Further, if the E-PHICH is configured in a corresponding subframe, it may be equally applied to a case of determining the OFDM symbol starting position of the E-PHICH.

The starting position of the E-PDCCH or the PDSCH may start from a second OFDM symbol or may start from a first OFDM symbol. If it starts from the second OFDM symbol, it is applied only to a case of an extended PHICH duration. If it starts from the first OFDM symbol, it is also applied to a case of a normal PHICH duration.

1. If the OFDM symbol starting position of the E-PDCCH is configured with RRC, a value greater than a PHICH duration $D_{PHICH}$ is configured. That is, if the PHICH duration is 2, the OFDM symbol starting position of the E-PDCCH is configured to a symbol which comes after a third OFDM symbol of a subframe. If a start OFDM symbol index of the E-PDCCH (it is assumed that a first OFDM symbol index is 0) is $S_{E-PDCCH\_RRC}$, it is set to $S_{E-PDCCH}=S_{E-PDCCH\_RRC} \geq D_{PHICH}$.

2. If a reference value for configuring the OFDM symbol starting position of the E-PDCCH is configured with RRC, a maximum value between the PHICH duration $D_{PHICH}$ and a value $S_{E-PDCCH\_RCC}$ configured with RRC is used. That is, $S_{E-PDCCH}=\max(S_{E-PDCCH\_RRC}, D_{PHICH})$.

For example, in a case where the PDDCH is sufficiently configured with two OFDM symbols whereas a PHICH duration requires 3 OFDM symbols, which is greater than 2 OF-DM symbols, an E-PDCCH region and a region of a PDSCH scheduled with an E-PDCCH may be effectively configured in a subframe in which a PHICH is not present.

That is, when $D_{PHICH}=3$, if it is set to $S_{E-PDCCH\_RCC}=2$ by considering a case where a PHICH is not present, a subframe in which the PHICH is not present may use a third OFDM symbol as an E-PDCCH or a PDSCH.

Figure 13:
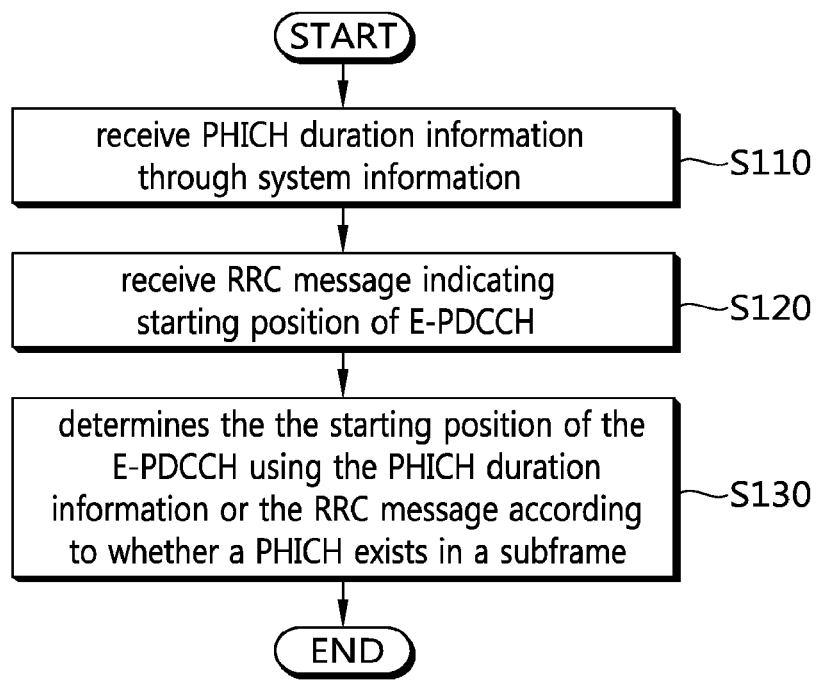
FIG. 13 shows a method of determining a starting position of an E-PDCCH.

FIG. 13 shows a method of determining a starting position of an E-PDCCH.

Referring to FIG. 13, a UE receives PHICH duration information through system information (step S110). The PHICH duration information may indicate $D_{PHICH}$.

The UE receives an RRC message indicating the starting position of the E-PDCCH (step S120).

The UE determines the the starting position of the E-PDCCH using the PHICH duration information or the RRC message according to whether a PHICH exists in a subframe (step S130).

If the PHICH exists in the subframe, a start OFDM symbol of the E-PDCCH is determined according to a greater value between the PHICH duration information and the starting position of the E-PDCCH indicated by the RRC message. On the other hand, if the PHICH does not exist in the subframe, the starting position of the E-PDCCH is determined according to the RRC message.

For example, the PHICH duration information and the RRC message may have different values such as a case where $D_{PHICH}=3$ and starting position information ($S_{E-PDCCH\_RRC}$) of the E-PDCCH indicated by the RRC message is set to 2. Therefore, the starting position of the E-PDCCH for each subframe may vary depending on a presence/absence of the PHICH. Accordingly, a resource can be more effectively used in comparison with a case where the starting position of the E-PDCCH is reported with the RRC message irrespective of the presence/absence of the PHICH.

Table 7 shows subframes in which a PHICH does not exist in a TDD UL-DL configuration. Subframes indicated by D are subframes in which the PHICH does not exist.

TABLE 7

| UL-DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | | | | | | | | |
| 1 | | D | | | | | D | | | |
| 2 | | D | D | | | D | D | D | | D |
| 3 | | | D | | | | D | D | D | |
| 4 | | D | D | | | D | D | D | | |
| 5 | | D | D | | D | D | D | D | | D |
| 6 | | | | | | | | | | |

Meanwhile, instead of a scheme of determining a starting position of an E-PDCCH (or PDSCH) by avoiding OFDM symbols in which a PHICH is transmitted, data mapping of the E-PDCCH and the PDSCH may be punctured or rate-matched in an REG region occupied by the PHICH.

In this case, if transmission of the E-PDCCH and the PDSCH requires an RE-pair of a frequency axis or a time axis similarly to a case of SFBC/STBC, even if one RE in the RE pair collides with an REG occupied by the PHICH, rate-matching is performed on both of them. For example, a case of using the SFBC may be a case of being scheduled with a DCI format 1A.

<An Operation when a PDSCH Region Collides with a Region (RB) Configured as a PHICH Transmission Region>

When a UE is scheduled for a PDSCH of a specific cell, the following operation may be performed in a DL subframe in which the PDSCH is scheduled.

1. When a PDSCH of the DL subframe overlaps with an E-PHICH region, the PDSCH is prioritized. That is, it is recognized that the E-PHICH region is not used.

2. A BS performs scheduling such that the PDSCH does not overlap with the E-PHICH region.

3. In case of the PDSCH, a region configured as the E-PHICH is unconditionally punctured or rate-matched. If a UE can recognize that only a part of the region configured as the E-PHICH is used for the UE, only the part may be punctured or rate-matched.

The method 3 may be applied only to a case of a PDSCH scheduled without a DL grant. For example, it may be applied only to a case where the BS transmits the PDSCH through DL SPS or the PDSCH is transmitted through bundled subframe scheduling. Hereinafter, for convenience, only SPS is used for explanation. If the DL grant exists, the BS may perform scheduling so as to avoid a collision of the PDSCH and the E-PHICH region, whereas if the PDSCH is scheduled with SPS without the DL grant, it may be inevitable to avoid the collision. Therefore, the method 3 is applied in this case.

If scheduling is performed with SPS, the following method may be applied.

When resource blocks including an E-PHICH region are allocated by using a normal DL grant, if an E-PDCCH region is punctured or rate-matched in the resource blocks, a puncturing or rate-matching operation shall not be performed on a region which collides with the E-PHICH region of a DL subframe in which a PDSCH is scheduled without a corresponding DL grant by using SPS scheduling. That is, the colliding region is recognized as a PDSCH transmission region. The puncturing implies that data is punctured after being carried on a corresponding region. The rate-matching implies that data is not carried on a corresponding region but is carried on the remaining regions to adjust to a transfer rate.

A subframe in which such an operation is performed may include or exclude a subframe in which a PDCCH/E-PDCCH indicating SPS activation is transmitted. In addition, it may be selectively applied according to whether a control channel indicating SPS activation is transmitted through the PDCCH or through the E-PDCCH. That is, when performing SPS scheduling, the scheduling is performed so that a collision does not occur with the E-PHICH.

In addition, in a subframe for receiving an E-PHICH (i.e., a subframe in which a UE previously performs PUSCH transmission and a BS transmits a corresponding E-PHICH), if a PRB including a resource occupied by the E-PHICH overlaps with the PDSCH, the PRB may be rate-matched or punctured by excluding a PDSCH allocation. In this case, if the PDSCH is scheduled without the E-PDCCH on another subframe scheduled with the E-PDCCH on the subframe (e.g., bundled subframe scheduling or SPS scheduling), the PDSCH may be used equally to a PDSCH scheduled on a subframe which is the same as that used in the E-PDCCH. That is, the PDSCH may be used by excluding the PRB which includes the resource occupied by the E-PHICH in the scheduled subframe.

In addition, in an E-PDCCH, if a PRB including an E-REG/E-CCE occupied by DCI of the E-PDCCH (including an SPS activation E-PDCCH) for scheduling a PDSCH (and/or PUSCH) overlaps with the PDSCH, the PRB may be rate-matched or punctured by excluding PDSCH allocation. In this case, if the PDSCH is scheduled without the E-PDCCH on another subframe scheduled with the E-PDCCH, the PDSCH may be used equally to a PDSCH scheduled on a subframe which is the same as that used in the E-PDCCH. That is, the PDSCH may be used by excluding the PRB which includes the E-REG/E-CCE occupied by the DCI.

Such a method has an aspect of maintaining a code rate for a case of initial scheduling and an aspect of preparing for a case where a UE misses a corresponding region when the region is a PRB preferably used to transmit DCI to the UE and when the region has a high possibility of being used again in DCI transmission.

The aforementioned methods may be respectively applied when a configuration location of the E-PHICH exists in an E-PDCCH region in which a CSS is configured and an E-PDCCH region in which a USS is configured. For example, a CSS region may use the method 3, and a USS region may use the methods 1 and 2. Alternatively, the methods may be applied only to an E-PDCCH set in which the E-PHICH is configured. Alternatively, the methods may be applied only to an E-PDCCH type (distributed E-PDCCH, localized E-PDCCH) in which the E-PHICH is configured. Preferably, the E-PDCCH may be configured in the distributed E-PDCCH. That is, the same is also applied to a case of the E-PDCCH.

This may conform to a relation between the E-PDCCH and the PDSCH. The aforementioned operation of E-PHICH and PDSCH may use the same technical feature as that applied to the relation between the E-PDCCH and the PDSCH.

<Restriction on Subframe Configured for E-PHICH>

There is a restriction on a subframe or PRB that can be configured for a case of E-PDCCH. For example, the following cases are possible in LCT.

1) A Special Subframe in which PDSCH Transmission is not Performed.

Special subframe configurations #0 and #5 for a normal CP and special subframe configurations #0 and #4 for an extended CP are applied herein. The special subframe configuration may be found in the section 4.2 of 3GPP TS 36.211 V8.6.0 (2009-03).

2) A subframe in which all E-CCEs are mapped to an RB in which a DM RS is not transmitted.

Examples thereof include a special subframe configuration #7 for an extended CP, an E-PDCCH set in which all E-CCEs overlap with PBCH/PSS/SS, etc.

3) A subframe in which some E-CCEs are mapped to a PRB in which a DM RS is not transmitted: A corresponding PRB when an RB allocated with E-PDCCH overlaps with an RB in which PBCH/PSS/SSS is transmitted.

A UE may assume that there is no E-PHICH transmission in a subframe in which an E-PDCCH is not transmitted, or in a subframe in which a part of the E-PDCCH is not transmitted, or in a corresponding PRB. That is, the UE does not attempt E-PHICH detection in a corresponding subframe.

Such a subframe restriction may be selectively applied according to each E-PDCCH set in which an E-PHICH is configured, each type, or the like similarly as described above. In this case, regarding a UL HARQ process corresponding thereto, the legacy PHICH may be used or a PHICH-less operation may be used.

Figure 14:
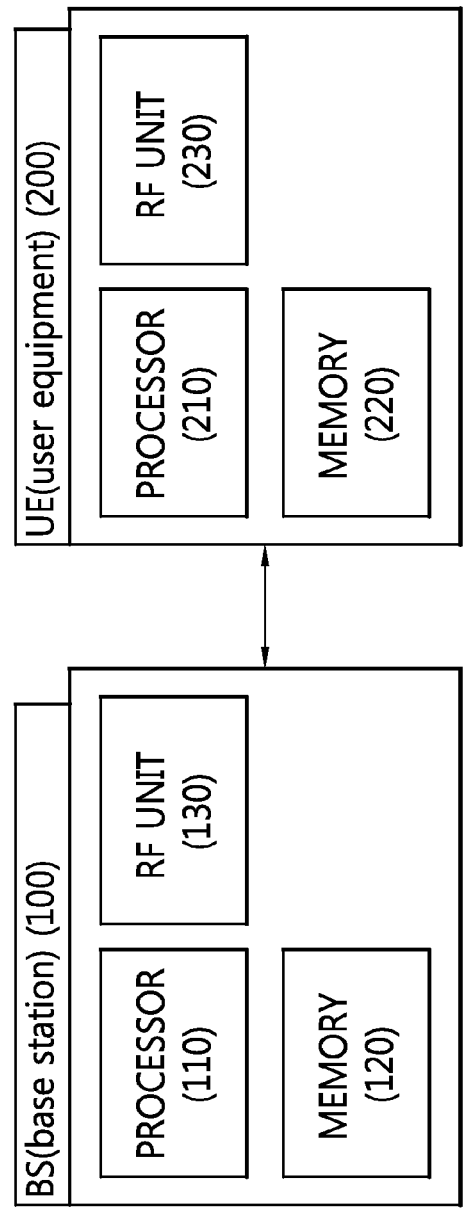
FIG. 14 shows a structure of a BS and a UE according to an embodiment of the present invention.

FIG. 14 shows a structure of a BS and a UE according to an embodiment of the present invention.

ABS 100 includes a processor 110, a memory 120, and a radio frequency (RF) unit 130. The processor 110 implements the proposed functions, procedures, and/or methods. For example, the memory 120 is coupled to the processor 110, and stores a variety of information for driving the processor 110. The RF unit 130 is coupled to the processor 110, and transmits and/or receives a radio signal.

A UE 100 includes a processor 210, a memory 220, and an RF unit 230. The processor 210 implements the proposed functions, procedures, and/or methods. For example, the memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), other chipset, a logic circuit, a data processing device, and/or a converter that converts a baseband signal and a radio signal to each other. The memories 120 and 220 may include a read-only memory (ROM), a random access memory (RAM0, a flash memory, a memory card, a storage medium, and/or other storage device. The RF units 130 and 230 may include one or more antennas that transmit and/or receive the radio signal. When the embodiment is implemented by software, the aforementioned technique may be implemented by a module (a process, a function, and the like) that performs the aforementioned function. The module may be stored in the memories 120 and 220 and may be executed by the processors 110 and 210. The memories 120 and 220 may be present inside or outside the processors 110 and 210 and connected with the processors 110 and 210 by various well-known means.

What is claimed is:

1. A method for performing communication in a wireless communication system, the method performed by a user equipment (UE) comprising:
receiving physical hybrid-ARQ indicator channel (PHICH) information, the PHICH information indicating PHICH duration in a subframe;
receiving enhanced-physical downlink control channel (E-PDCCH) information the E-PDCCH information indicating a starting orthogonal frequency division multiplexing (OFDM) symbol of an E-PDCCH in the subframe; and
performing communication based on the E-PDCCH information and the PHICH information,
wherein the E-PDCCH information is received via a radio resource control (RRC) message, and
wherein, in the subframe, the starting OFDM symbol of the E-PDCCH is configured after an OFDM symbol indicated by the PHICH duration.

2. The method of claim 1, wherein the PHICH information indicating the PHICH duration is received via another RRC message.

3. The method of claim 1, wherein acknowledgement/not-acknowledgement (ACK/NACK) for uplink data which is transmitted from the UE is received during the OFDM symbol indicated by the PHICH duration.

4. The method of claim 1, wherein the PHICH duration is normal PHICH duration or extended PHICH duration.

5. The method of claim 4, wherein when the PHICH duration is the normal PHICH duration and the subframe is a non-Multicast-broadcast single frequency network (MBSFN) subframe, the PHICH duration is 1.

6. The method of claim 4, wherein when the PHICH duration is normal PHICH and the subframe is a Multicast-broadcast single-frequency network (MBSFN) subframe on a carrier supporting a Physical Downlink Shared Channel (PDSCH), the PHICH duration is 1.

7. A user equipment (UE), the UE comprising:
a transceiver; and
a processor operatively coupled to the transceiver,
wherein the processor:
controls the transceiver to receive physical hybrid-ARQ indicator channel (PHICH) information, the PHICH information indicating PHICH duration in a subframe;
controls the transceiver to receive enhanced-physical downlink control channel (E-PDCCH) information, the E-PDCCH information indicating a starting orthogonal frequency division multiplexing (OFDM) symbol of an E-PDCCH in the subframe; and
performs communication based on the E-PDCCH information and the PHICH information,
wherein the E-PDCCH information is received via a radio resource control (RRC) message, and
wherein, in the subframe, the starting OFDM symbol of the E-PDCCH is configured after an OFDM symbol indicated by the PHICH duration.

* * * * *